United States Patent [19]

United States Patent [19]
Dobson et al.

[11] Patent Number: 5,819,215
[45] Date of Patent: Oct. 6, 1998

[54] METHOD AND APPARATUS FOR WAVELET BASED DATA COMPRESSION HAVING ADAPTIVE BIT RATE CONTROL FOR COMPRESSION OF DIGITAL AUDIO OR OTHER SENSORY DATA

[76] Inventors: Kurt Dobson, #6 Quietwood La., Sandy, Utah 84092; Nathan Whitney, 6620 S. 5135 West, West Jordan, Utah 84084; Kevin Smart, 1099 S. Bountiful Blvd., Bountiful, Utah 84010; Peter Rigstad, 1816 E. 3900 South, Salt Lake City, Utah 84124; Jack Yang, 1636 W. Gaylawood Cir., Murray, Utah 84123

[21] Appl. No.: 543,205

[22] Filed: Oct. 13, 1995

[51] Int. Cl.$^6$ ........................................................ G10L 9/18
[52] U.S. Cl. .............................................. 704/230; 704/500
[58] Field of Search ................................... 395/2.38, 2.39, 395/2.12, 2.14; 345/396, 397; 382/232, 240, 244, 248; 704/229, 230, 203, 205, 500, 501, 504

[56] References Cited

U.S. PATENT DOCUMENTS

| | | | |
|---|---|---|---|
| 4,302,775 | 11/1981 | Widergren et al. | 358/136 |
| 4,394,774 | 7/1983 | Wildergren et al. | 382/56 |
| 4,700,360 | 10/1987 | Visser | 375/22 |
| 5,222,189 | 6/1993 | Fielder | 395/2 |
| 5,311,561 | 5/1994 | Akagiri | 375/122 |
| 5,347,305 | 9/1994 | Bush et al. | 348/14 |
| 5,388,181 | 2/1995 | Anderson et al. | 395/212 |
| 5,388,182 | 2/1995 | Benedetto et al. | 395/2.14 |
| 5,394,508 | 2/1995 | Lim | 395/2.38 |
| 5,408,580 | 4/1995 | Stautner et al. | 395/2.14 |
| 5,412,741 | 5/1995 | Shapairo | 382/232 |
| 5,430,690 | 7/1995 | Abel | 367/135 |
| 5,453,945 | 9/1995 | Tucker et al. | 364/725 |
| 5,481,308 | 1/1996 | Hartung et al. | 348/398 |
| 5,495,292 | 2/1996 | Zhang et al. | 348/487 |
| 5,546,477 | 8/1996 | Knowles et al. | 382/242 |
| 5,600,373 | 2/1997 | Chui et al. | 348/397 |
| 5,610,657 | 3/1997 | Zhang | 348/415 |

OTHER PUBLICATIONS

J. Princen and J. D. Johnston, *Audio Coding With Signal Adaptive Filterbanks*, AT&T Bell Laboratories, pp. 3071–3074, IEEE 1995.

D. Pan, *A Tutorial On MPEG/Audio Compression*, Motorola, pp. 60–74, IEEE MultiMedia, Summer 1995.

K. Brandenburg and G. Stoll, *ISO–MPEG–1 Audio: A Generic Standard For Coding Of High–Quality Digital Audio*, J. Audio Eng. Soc., vol. 42, No. 10, pp. 780–792. Oct. 1994.

N. Jayant, J. Johnston, and R. Safranek, *Signal Compression Based On Models Of Human Perception*, Proceedings of the IEEE, vol. 81, No. 10, pp. 1385–1421, Oct. 1993.

D. Sinha and A. Tewfik, *Low Bit Rate Transparent Audio Compression Using Adapted Wavelets*, IEEE Transactions on Signal Processing, vol. 41, No. 12, pp. 3463–3479, Dec. 1993.

K. Ferens and W. Kinsner, *Adaptive Wavelet Subband and Coding for Music Compression*, p. 490, IEEE 1995.

(List continued on next page.)

*Primary Examiner*—Allen R. MacDonald
*Assistant Examiner*—Richemond Dorvil
*Attorney, Agent, or Firm*—Workman, Nydegger & Seeley

[57] ABSTRACT

The compression method utilizes a combination of both lossy and lossless compression to achieve significant compression while retaining very high subjective quality of the reconstructed or decompressed signal. Methods and apparatus for compression and decompression of digital audio data are provided. In one preferred embodiment, the compression method or apparatus has a bit rate control feedback loop particularly well suited to matching the output bit rate of the data compressor to the bandwidth capacity of a communication channel. Embodiments trade-off various error sources in order to keep perceptible distortion levels to a minimum for a fixed bit rate. Preferred embodiments also utilize a unique combination of run length and Huffman encoding methods in order to take advantage of both local and global statistics.

94 Claims, 8 Drawing Sheets

OTHER PUBLICATIONS

Nass, "Competitive–Video Compression–Decompression Schemes Forge Ahead," Electronic Design (1994).

Mandridake et al., "Joint: Wavelet Transform and Vector Quatization for Speech Coding," vol. 1 IEEE, pp. 699–702, (May 1993).

Sinha, "Low Bit Rate Transparent Audio Compression Using Adaped Wavelets," vol. 41, No. 12, IEEE, pp. 3463–3478, (Dec. 1993).

Kinsner et al., "Speech and Image Signal Compression With Wavelets," IEEE Conference Paper, (1993).

Black et al., "Computationally Efficient Wavelet Packet Coding of Wide–Band Stereo Audio Signals," IEEE (1995).

Heegard et al., "High–Fidelity Audio Compression: Fractional–Band Wavelets," IEEE (1992).

Goh et al., "Speech Coding by Wavelet Representation of Residual Signal," IEEE (1994).

Sinha et al., "Low Bit Rate Transparent Audio Compression Using A Dynamic Dictionary and Optimized Wavelets," vol. 1, IEEE pp. 197–200 (1993).

Scholl et al., "Audio Signal Compression With Circular Wavelet Packets," SPIE vol. 2303.

Tewfik et al., "Enhanced Wavelet Based Audio Coder," IEEE (1993).

Ali et al., "Real Time Implementation of Second Generation of Audio Multilevel Information Coding," SPIE vol. 2242 (1994).

METHOD AND APPARATUS FOR WAVELET BASED DATA COMPRESSION HAVING ADAPTIVE BIT RATE CONTROL FOR COMPRESSION OF DIGITAL AUDIO OR OTHER SENSORY DATA

BACKGROUND OF THE INVENTION

1. The Field of the Invention

This invention relates to lossy (as opposed to lossless) compression schemes using wavelet transformations to concentrate the relevant signal information and thereby provide opportunities for compression. Furthermore, this invention relates to compression methods that are adapted for use in real time transmission applications where a low data bit rate is desirable along with reduced hardware processing requirements.

2. Present State of the Art

A variety of schemes exist for the compression of data representing audio, visual, or other information. There are numerous and different constraints, depending upon the nature of the data and the context of the compression, that influences the optimal compression method for a given application. For example, compression of computer files for long term storage would have constraints different than continuous transmission of compressed signal information representing real time audio or image data.

Compression schemes used for computer data files having information that ultimately must be used by the computer (e.g. a file for a word processing program) must retain all the information of the file in order to create an exact copy upon decompression. is An error of even one bit will totally corrupt the file. On the other hand compression schemes used for information that is ultimately discernable by human senses can eliminate some of the information in the original signal since the human senses have finite capabilities in perception ability.

The nature of human sensual perception has been utilized advantageously in lossy compression since it is only necessary to recreate (decompress) a signal to the degree necessary to convince the human senses to a required subjective quality rather than to perfectly recreate the signal. There are even applications where the reproduced signal may suffer a perceptible degradation in quality but still be sufficient for the desired application.

Multimedia computing utilizes a variety of visual and auditory information in computing applications. There exists a need in many instances to communicate multimedia information with or without computer data information over telephone lines using ordinary modems or other channels typically associated with computer data information. One example is to transmit voice or other sound signal information with data over a modem. This would allow one phone line to accommodate conversation between the users while data is simultaneously transmitted between them. This is commonly known as Simultaneous Voice and Data (SVD) and provides the framework for collaborative computing. Another example would be to communicate sound information over a computer network, utilizing the network data communications channel normally associated with computer data information to carry voice and other sound information in real time. Finally, large scale networks such as the internet that utilize a variety of computer data channels is yet another example where real time sound signal information requiring a low data bit rate would find application.

The internet provides interesting possibilities for such an application because of its widespread, even worldwide use. It is desirable to communicate sound information as well as computer data information over a common data channel at computational rates that can be accommodated by the current installed base of computer hardware or at least a substantial portion of it.

The nature of real time sound compression, transmission, and decompression provides a number of important constraints that must be addressed in any successful compression scheme tailored to this application. Namely, there is a limited data bit rate that can be utilized, limited computational resources to process the continuous nature of a constant signal such as real time sound, and a requirement for reasonable reproduction of the signal in both perceptible quality and timeliness.

Throughout this application, the continuous signal to be compressed and decompressed will be expressed as audio data. However, the signal could easily encompass video data or other information that is ultimately perceived by the human senses.

Typically, compressed sound data according to the field of this invention is eventually transmitted over a digital transmission medium such as network communications lines, public phone lines, microwave links, etc. or hybrid combinations. These data communications channels have characteristics and limits to the amount of data that can be transmitted (data transmission rates). Real time transmissions require relatively large amounts of data to maintain a continuous analog signal that is recreated in real time.

Furthermore, any given data channel may be subdivided into a variety of channels for carrying distinct sound signals. The varying degrees of compression due to the characteristics of actual sound signals may advantageously be utilized to increase total multiple signal throughput while maintaining acceptable reproduction quality.

Referring now to the example of public telephone lines, the highest data bit rate that the public phone lines can reliable handle is estimated at 32 kbps. The currently available modems operating at 14.4 kbps and 28.8 kbps are effectively pushing near these physical limits. Of this bandwidth amount, only a portion can be allocated to a continuous signal such as speech while allowing simultaneous data transmission at acceptable rates. A compression scheme should allow dynamic adjustment of the allocated bandwidth dedicated to continuous signals. However, to date, there have been no compression schemes that allow such dynamic adjustments in a manner which maximizes the use of available communication bandwidth to transmit both data and high quality audio information.

When the bandwidth available for transmission is relatively fixed, bit rates necessary to transmit compressed sound data at acceptable reproduction levels and timing is primarily determined by the nature of the sound data itself. For example, conversational speech will have many pauses where very high compression can take place while music would have less of such dead space.

Because many modems are already in existence running on host processors, it is desirable to run a compression scheme utilizing computational resources of the host processor if possible. While newer modems may contain dedicated assistance hardware, this would eliminate a sizable number of potential users from being able to participate in collaborative computing allowed by an appropriate compression scheme. Many compression schemes in use today are not capable of running in real time on standard computer hardware. These compression schemes generally use very fast general purpose or special purpose computer hardware to compress data which will be transferred at a later time. Even in the best of situations, where fast personal computers are used, there can be a significant time delay in the compression process. Real time or very near real time compression is required to transmit a continuous audio signal so that decompression and reconstruction of the signal can occur in a timely manner. If real time, or very near real time compression is not achieved, "live" transmission of a continuous audio signal cannot occur effectively.

It would, therefore, represent an advancement in the art to provide a compression scheme which significantly reduced the computational or processing power required to is compress an audio signal so that real time or very near real time compression can be achieved with standard personal computer hardware. While current decompression schemes generally require less processing power than current compression schemes, similar problems still exist.

One sound compression technique that addresses the requirement for a low data bit transmission rate while providing acceptable reproduction quality of human speech is Linear Predictive Coding (LPC). This is a mathematical model of the human vocal system to anticipate an entire sound based on a fragment of the sound. Though the data bit rate is minimal and sound quality is reasonable for pure speech, it is compute intensive and requires substantial latency to compress human speech. Other quality drawbacks include deteriorated performance for sound other than human speech and significantly degraded performance if human speech is mixed with background noise or other voices.

It is known to use wavelet transforms to compress speech and image data. Many schemes concentrate on encoding residual signals leftover after some other coding scheme, such as LPC, has already encoded the majority of the signal. Typically, sampled sound data is transformed into the wavelet domain where methods are used to eliminate non-necessary coefficients. Finally, the coefficients are quantized and encoded using entropy encoding. Reversing the process provides the decompression side of the scheme. Various improvements have been made according to the situation to this basic model that utilize sophisticated vector quantization methods, adaptive wavelet transforms, and tree encoding. These improvements typically come at the expense of processing power.

Others have optimized the wavelet transform to frequency bands of particular interest. This provides more coefficients in the desired regions while leaving less resolution in non-critical regions.

A main factor in increasing compression ratios for any wavelet based scheme is to quickly and efficiently reduce the coefficients based on a number of criteria. Many have utilized the psychoacoustic model to help determine which coefficients to eliminate. For example, there are certain small coefficients that represent information that is not detectable by human hearing. Also, it is known to reduce coefficients due to perceptual masking of sounds related in frequency. For example, a high energy sound in one frequency will tend to mask from perceptible human hearing the sounds of lesser energy at nearby frequencies. Again, some techniques require significant compute resources to perform these forms of coefficient reduction.

When coefficients are identified for reduction (elimination) they are set to a known value, usually null. Coefficient location within the frame, even if null, is still important for accurate recreation of the signal. As the null coefficients mount in numbers, there are many strings of contiguous null coefficients which lend themselves to Run Length Encoding (RLE) as has been exploited by others. The more coefficients that are eliminated, the higher the ultimate compression ratio since RLE will provide very high compression on the contiguous strings of null coefficients.

Current wavelet based schemes, however, still suffer from many drawbacks. Early attempts at using wavelet based encoding methods used performance measures such as data signal to noise ratio (SNR). These attempts eliminated wavelet coefficients until this measure began to suffer degradation. Unfortunately, the resulting speech was of such poor quality that many concluded that wavelet based compression was impractical for audio information. Although later schemes provided some improvements, audio quality was still relatively poor. This led many to combine wavelet based compression with some other form of compression such as LPC. These attempts to overcome the limitations of both methods by taking advantage of the strengths of both techniques however require a large amount of processing power.

Thus, it appears that there exists no compression scheme that can run in real time or near real time on conventional personal computer hardware and provide substantial audio data. Furthermore there does not currently exist compression schemes which work well with a wide variety of audio data while still preserving the subjective quality of the audio data. There also does not exist any compression scheme which can adapt the compression ratio achieved in order to match the existing transmission capability at a communication channel. Finally, there exists no compression scheme which can adapt the compression ratio dynamically to continue to match the transmission capability of a communication channel when that capability is a time varying quantity which fluctuates over a fairly short period of time.

SUMMARY AND OBJECTS OF THE INVENTION

It is an object of this invention to provide a method of compressing signal information for real time transmission and decompression at low data bit rates and low processing requirements while maintaining high quality of the decompressed signal information.

It is a further object of this invention to reduce wavelet domain coefficients representing a signal quickly and efficiently.

An advantage of this invention is equivalent compression at reduced processor requirements over the prior art.

A feature of the invention is to remove gain from a sampled frame in the wavelet domain before quantizing the wavelet coefficients.

Another object of this invention is to allow simultaneous voice and data using ordinary modems at relatively low bit rates.

An advantage of this invention is to detect the data bit rate available for compressed signal transmission.

Another advantage of this invention is to dynamically adjust the compression variables in order to match a given available bit rate.

Another feature is to take advantage of delays, pauses, and other characteristics of sound information to smooth out processing intensive peaks while keeping within an acceptable lag or latency time.

Yet another feature of this invention is to use feedback principles to continuously update the number of coefficients to be eliminated in order to meet the allowable date bit rate requirements.

Yet another object of this invention is to provide a compression scheme to allow real time audio signal transmission over traditionally data-only digital networks.

A further object of this invention is to provide high quality audio data transmission by adaptively trading off the impact of various error sources so as to minimize perceptible distortion at a fixed bit rate.

A still further feature of this invention is to provide adaptive bit rate control which balances the level of quantization noise and the number of coefficients eliminated to minimize perceptible distortion at a fixed bit rate.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

To achieve the foregoing objects, and in accordance with the invention as embodied and broadly described herein a method and apparatus for wavelet based compressing and decompressing signal information having adaptive bit rate control is provided. The invention can be embodied in an optimal mix of compression technologies to achieve real time full duplex simultaneous audio and data transmission through a personal computer modem utilizing the host computer systems as the signal processor to compress and decompress the is audio signal. The invention can also be embodied to carry sound information over channels typically associated with data only such as computer modem communications channels.

Throughout this specification, reference will be made to a signal corresponding to sound. However, the techniques disclosed herein can readily be applied to many other forms of data suitable for lossy compression and more particularly for data that is to be sensed with human, or in a broader sense mammalian, sensory organs. The modeling of the human sensory organs is used in arriving at higher compression ratios, higher effective transmission rates, or more computationally efficient compression. For sound, psychoacoustic models are used to model human hearing traits and there are corresponding models for the human perception of visual information.

Throughout this application, the data channel will be illustrated as a phone line between two personal computers having modems. The processing for compression will be the host personal computer processor. These are not intended to be limiting since those skilled in the art will see that processing could advantageously take place on specialized hardware should it be available or the data channel could be another form of linkage such as two personal computers communicating through Ethernet adapter cards over Ethernet cable.

The invention comprises a method of compressing and decompressing data in real time with lean processor requirements. A conceptual block diagram is shown in FIG. 2. An analog sound signal is digitally sampled at a desired rate and the samples are typically arranged in a data frame for compression. Sampling rates usually vary between 8k s/sec to 44.1k s/sec at a normal resolution of 8 or 16 bits per sample of unsigned integers although the present invention is independent of sample rate and can be used with any sampled data. The sampling rate is determined as a function of desired signal quality of the decompressed audio signal. For example, speech requires less sampling rate and resolution than accurate reproduction of music which may require higher sampling rates and resolution. The data frame size is usually chosen between 32 and 4096 samples although any data frame size can be used.

Energy and entropy calculations are made on the sampled data prior to transformation into the wavelet domain. These calculations can be used for future coefficient reduction based on the psychoacoustic model. In one embodiment these values are used to select the number of quantization bits to encode the signal before transmission or storage. In other embodiments, these values represent only one component used to calculate the number of quantization bits used.

The sampled data in the frame is converted from unsigned integer data into floating point data and scaled with the values falling between $-1.0$ and $+1.0$ Although not strictly necessary, the scaling allows for a consistent implementation regardless of the specific details of the input data. In other words, by scaling the data between $-1.0$ and $+1.0$ the internal workings of the compressor and the values used in various parts of the compressor remain independent of the specific sample format of the input data The samples are then transformed into the wavelet domain using a Daubechies 12 wavelet transform although any wavelet transform can be used. Some may be optimized to particular frequency bands of interest or providing more detail in some frequency ranges than others according to the needs of the application. Presently, however, it is preferred to use a standard decomposition tree structure in the wavelet transform.

The wavelet domain representation of the data frame is in the form of wavelet coefficients. Compression is achieved by a combination of reducing the total number of coefficients to be saved, selecting an optimal number of bits for quantizing the remaining coefficients, and entropy encoding the quantized coefficients.

After the data has been transformed into the wavelet domain the coefficients are examined to determine which coefficients can be eliminated without effecting the quality of the signal. Wavelet coefficient elimination or reduction represents a significant area for optimized compression. While many reduction schemes have been introduced, they usually require significant computational resources that make them unsuitable for real time transmission using a PC as the host processor. The invention described herein reduces coefficients more efficiently than the current state of the art by innovative schemes that strike the careful balance between effective reduction within very constrained processor requirements.

The main focus of coefficient reduction is to eliminate enough coefficients to meet the desired allowable data bit rate while maintaining adequate representation of the signal. Information of the allowed data bit rate at a given point in time is used to calculate the fraction of coefficients that must be eliminated in order to meet the desired data bit rate. In one embodiment, this is constantly or dynamically adjusted and will depend on a number of factors including the number of bits sent in the previous data frame. This is explained in more detail in reference to the data bit rate control aspect of the invention.

As the data frame containing the wavelet coefficients is initially processed, the coefficients are also arranged by indexing or other means in an ordered fashion, highest to lowest, in absolute magnitude. Thus, when the fraction of coefficients to be eliminated is determined, it is a simple matter to locate all such coefficients and set them to null because of the magnitude ordering information. When the fractional value becomes high, it may be desirable to reduce the number of quantization bits for each coefficient and retain more coefficients to improve signal reproduction quality. In one embodiment, the bit rate control aspect of the invention balances the fraction of coefficients eliminated and the number of quantization bits in order to minimize perceptible distortion at a fixed bit rate.

A threshold value based on the ability of human perception of the recreated signal is applied to all remaining coefficients to remove all coefficients that contain information that is imperceptible. By doing this, frames having mostly imperceptible information will be highly compressed rather than storing information relating to silence or other information not perceptible to the human senses.

The allowable bit rate from the compressor may be a function of many factors. In some applications, only a few or one of these factors may influence the bit rate. In others, many factors may influence the bit rate. Some factors include the bandwidth available for use, data waiting to be transmitted and backed up processing of the data frame. The allowable data bit rate value may fluctuate depending on the nature of the actual data compressed, processing interruptions, latency constraints, etc. but may also be fixed in some environments.

In one embodiment, a bit rate control aspect is provided. The bit rate control aspect is used to match the bit rate from the compressor to the allowable bit rate. The bit rate control aspect uses a setpoint which is established as the desired data bit rate and an error value which is calculated based on the actual output bits from the previous frame in comparison with the desired data bit rate. The error value is used to adjust the fraction of coefficients eliminated and/or quantization bits used in order to maintain a bit rate generally at the setpoint value. In some embodiments the setpoint value is fixed and in other embodiments the setpoint value is a time varying quantity based on various factors such as the currently available communication bandwidth or data latency. To maximize total data throughput, the setpoint should be set to the maximum allowable data bit rate. This feedback loop keeps the bit rate within the capabilities of the transmission medium so that real time transmission of sound data may occur with little effective latency.

In one embodiment the gain is taken out of the signal and stored in the output data frame. This is readily accomplished by dividing all wavelet coefficients by a fixed gain value. In some embodiments this gain value may be the highest wavelet coefficient value in terms of absolute magnitude. In other embodiments, the gain is a filtered estimate of the highest wavelet coefficient in terms of absolute magnitude. By removing the gain, the remaining signal is better suited for accurate quantization. Furthermore, such a scheme provides a benefit in the entropy encoding block. When the gain is a filtered estimate, changes in gain between signals is moderated to reduce perceptible distortion of the signal and to take advantage of psychoacoustic masking through small signal suppression. The gain is preferably clipped between a maximum value and a minimum value to eliminate conditions that cause significant distortion in the signal.

After the gain is taken out, the wavelet coefficients are quantized using a fixed number of bits to represent each wavelet coefficient. Another method that may be used to influence the bit rate to bring it within desired limits is through selection of the number quantization bits used to represent the quantized wavelet coefficients. By selecting a lower number of bits per wavelet coefficient, less total bits are required to represent the output data frame. In current embodiments, the coefficients are quantized linearly although other schemes are within the scope of the invention. In one embodiment, the number of bits used to represent wavelet coefficients are based on the energy and/or entropy characteristics of the frame. High energy or entropy signals in current embodiments will need lower quantization resolution while highly concentrated signals (low entropy) and low energy signals will require higher quantization resolution. In one embodiment, the product of the entropy and energy characteristics is used to determine a quantization level (i.e. the number of bits to be used to quantize coefficient). In other embodiments, measures such as these represent but one input into a process that trades off various error sources to minimize perceptible distortion.

Quantization of the wavelet coefficients takes each coefficient and conceptually places it into an integer bin. The number of bins available, and hence the resolution of the quantized signal, is determined by the number of quantization bits selected. This number may be fixed or dynamic depending upon the embodiment.

After quantization, the output data frame is further compressed using various forms of entropy encoding. A wide variety of entropy encoding methods are suited to the present invention and both entropy encoding using fixed codebooks or entropy encoding using adaptive codebooks can be used with the present invention. Various factors, including the intended operating application environment, will influence the choice of entropy encoding. In one embodiment, two forms of statistical encoding are used, Run Length Encoding (RLE) to compress the large numbers of contiguous null coefficients and multiple Huffman coding for encoding the constituent parts of the output data frame. Currently, fixed codebook Huffman coding is utilized but gains may be made in certain applications by using adaptive forms of Huffman encoding. Huffman encoding essentially assigns few numbers of bits to frequently occurring information and higher numbers of bits to less frequently occurring information to realize a net gain in total numbers of bits used.

The output data frame is created by putting the gain information, if separated out from the wavelet coefficients, and quantization level at the beginning. Both of these values are Huffmnan encoded using a gain codebook and quantization codebook respectively. In one embodiment, the quantization level is used to select the proper codebook used to encode and decode the quantized wavelet coefficients. In such an embodiment, the wavelet coefficients are traversed in order and wavelet coefficients are encoded using the appropriate coefficient codebook for the designated quantization level. A codebook contains the relationship between actual bits to be put into the output data frame and corresponding values of the information to be encoded such as coefficients, gain, quantization level, and run lengths counts.

Prior to or during Huffman encoding, contiguous runs of null wavelet coefficients are run length encoded. The run length encoding produces at least a run length marker and a run length count. The run length marker is Huffman encoded like any wavelet coefficient while the run length count is encoded using a separate run length count codebook. After complete encoding, the encoded output data frame is sent through the digital data channel to be decompressed on the receiving side or stored for later retrieval and decompression.

Decompression is comparatively simple and requires somewhat less computational resources than compression. Essentially, many of the same steps used for compression are used in reverse order. These steps are to entropy decode the encoded output data frame into coefficients, multiply the gain information back into the coefficients, transform the coefficients back into the time domain, take care of any residual scaling, and finally convert the data into integer sound samples to be reconstructed into audio or other signal information.

The quantization level at the beginning of the encoded output data frame is entropy decoded using the quantization level codebook and determines which coefficient codebook to use for processing the coefficient portion of the encoded output data frame should multiple coefficient codebooks be implemented. It may be noted that adaptive entropy encoding implementations may include information such as the actual codebook or information to change the existing codebook used in decompression of the previous output data frame. Each coefficient encountered is placed in the reconstructed output data frame using the appropriate coefficient codebook. When a run length marker is encountered, the length of contiguous null coefficients is decoded using the run length count codebook. The string of null coefficients is then recreated and placed in the reconstructed output data frame.

After the coefficients have been entropy decoded, the gain value from the encoded output data frame is decoded using the gain codebook and multiplied across all coefficient values. In this state, the reconstructed output data frame is inverse transformed from the wavelet domain back into the time domain. Embodiments using one of a plurality of wavelet transforms dependant on the actual nature of the data, can include information identifying the transform used in compression to ensure the identical transformation equation is selected for decompression.

The transformed coefficients are now rescaled back into digitally sampled data to be converted to an analog signal or stored. Decompression is complete at this point.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The current invention embraces within its scope both methods and apparatus for compressing digital audio data. Thus, the descriptions of the preferred embodiments which follow should be read to include both methods and apparatuses. With particular regard to the apparatuses involved, no particular limitation is envisioned. Thus, the apparatus may involve dedicated hardware including discrete components, shift registers, custom VLSI chips, and the like, as well as general purpose computer or digital signal processing hardware having a conventional arrangement including a processing unit, memory (volatile and/or nonvolatile), input devices, display devices, mass storage devices, and the like. From the description which follows, those skilled in the art will recognize that a variety of hardware and/or software configurations are suitable apparatus for practicing the disclosed invention.

Figure 1:
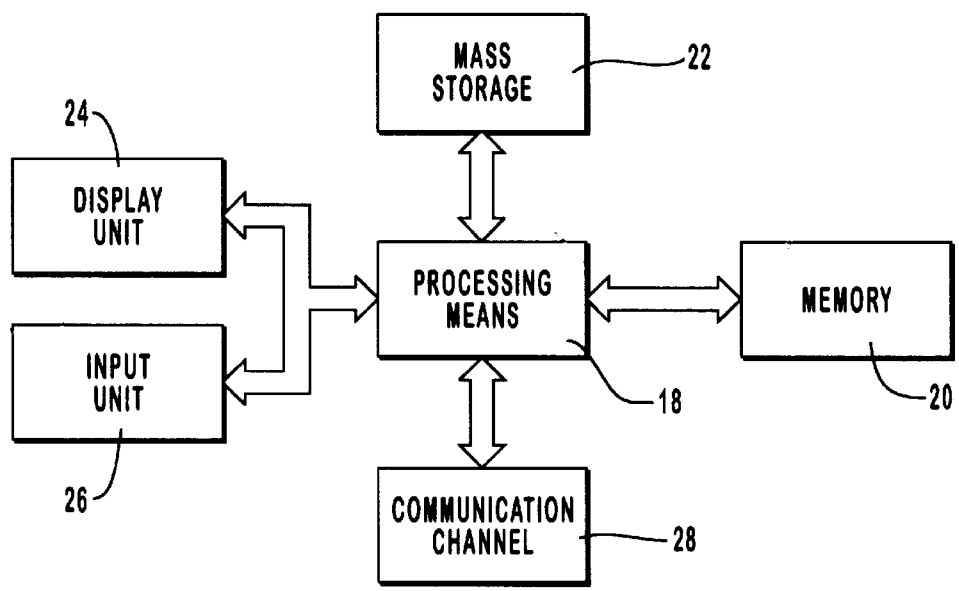
FIG. 1 is a high level block diagram showing an example apparatus structure.

By way of example, and not limitation, a suitable hardware apparatus is illustrated in FIG. 1. In FIG. 1, the apparatus comprises processing means 18. Processing means 18 preferably comprises a general purpose microprocessor like those commonly used in personal computers or workstation computers. Processing means 18 could, however, also comprise a digital signal processor, a specialized processor custom tailored to the inventive method disclosed herein, or any combination of a general purpose microprocessor, a digital signal processor, and a specialized processor.

Electrically connected to processing means 18 is memory 20. Memory 20 is preferably comprised of a combination of both volatile and non-volatile memory. Depending on the application, however, memory 20 may also comprise either solely volatile or solely non-volatile memory.

Processing means 18 is also electrically connected to mass storage 22. Mass storage 22 preferably comprises a combination of fixed and removable computer disk storage (either magnetic or optical) although the apparatus could be configured with only fixed computer disk storage or removable disk storage.

In order to interface with the outside world, the apparatus also comprises display unit 24, input unit 26, and communication channel 28. Display unit 24 and input unit 26 are for displaying information to a user and receiving input from a user respectively. Typical devices usually used to implement display unit 24 are monitors, plasma displays, LCD screens and the like. Typical devices used to implement input unit 26 include a keyboard, a mouse, a touch pad, and the like.

Communication channel 28 represents communication through a computer network, land line telephone network, cellular telephone networks, and the like. In some instances, a modem (not shown) may be necessary to interface processing means 18 with communication channel 28. In such a situation, the modem usually resides between processing means 18 and communication channel 28. Furthermore, some embodiments are designed to be used without a communication channel such as when data is compressed and stored on mass storage 22 for later retrieval and decompression.

Computer useable medium having computer readable code means embedded or encoded thereon is also contemplated. In such an article of manufacture, the computer readable program code means will comprise various means for implementing the method disclosed herein. By way of example, and not limitation, suitable computer useable media include magnetic disks (both fixed and removable), optical disks, magnetic tape, volatile memory, nonvolatile memory, and the like. In these articles of manufacture the term "embedded therein" should be read to include the various methods of encoding computer readable program code means so they are contained on or in the computer usable media.

Throughout this application, the invention is described in relation to audio data. However, the invention is not so limited and references to audio data should not be construed as limiting the scope of this invention. The invention will also work with visual or other data perceived by the senses. Thus references to audio data are to be considered as illustrative examples.

Figure 2:
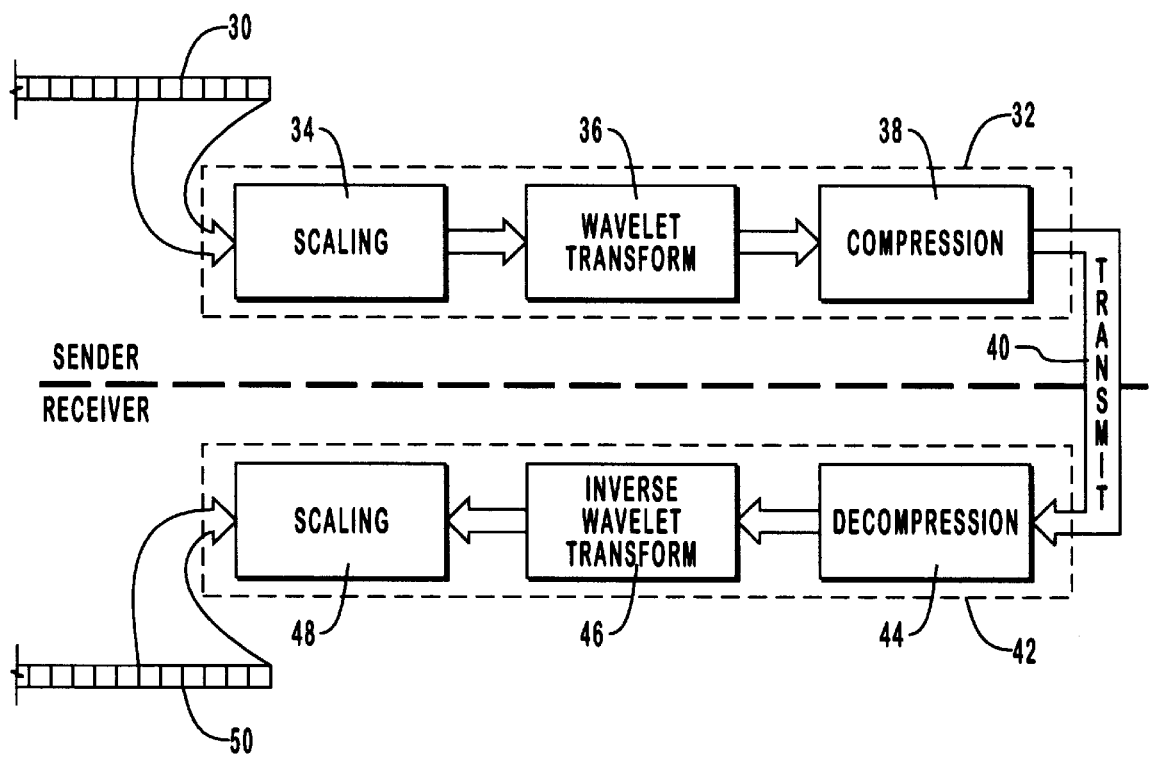
FIG. 2 is a high level block diagram of the compression and decompression process of the present invention.

Referring next to FIG. 2, a general overview of the present invention is illustrated. In FIG. 1, digital data, represented by input data stream 30, is input into data compressor 32. Data compressor 32 can either be configured to take input data stream 30 on a continual basis and process the data sample by sample or data compressor 32 can be configured to break input data stream 30 into individual data frames each having a fixed number of data samples. Currently, it is preferred that data compressor 32 be configured to break input data stream 30 into individual data frames each having a fixed number of data samples. Throughout this patent, this will be referred to as block processing. If data compressor 32 is configured to process the data samples without breaking data stream 30 into separate data frames, the patent will refer to that processing as stream or continuous processing.

Data compressor 32 performs three fundamental functions. The first function is to scale the input data. This function is illustrated in FIG. 2 by scaling block 34. Scaling is not strictly necessary and the primary function of scaling block 34 is to make processing easier within data compressor 32. By scaling the input data the implementation details of other blocks in data compressor 32 can remain fixed independent of the size and sample format of the audio data in input data stream 30. In other words, scaling provides a consistent interface to the remaining blocks in data compressor 32. Depending on the exact apparatus used to implement data compressor 32, however, scaling may also perform other highly important functions. Such functions include minimizing round-off error in the data as it is processed, minimizing the effect of fixed word size within the processing apparatus, allowing the use of fixed point processing rather than floating point processing, and the like.

After the input data is appropriately scaled, the next function of data compressor 32 is to perform a wavelet transform on the data. This function is illustrated in FIG. 2 by wavelet transform block 36. Wavelet transform block 36 converts the input data from the time domain to the wavelet domain. Any wavelet transform can be used. It is, however, presently preferred to use a Daubechies 12 transform having a standard decomposition tree structure.

The next function of data compressor 32 is to compress the wavelet coefficients. This is illustrated in FIG. 2 by compression block 38. Compression block 38 is designed to reduce the number of bits needed to represent the digital audio data. In order to achieve the performance desired in this invention, a combination of lossy and lossless compression is utilized. At all times in the compression process the quality of the reconstructed data is considered. Thus, tradeoffs can be made between lossless and lossy compression in order to achieve a compact representation while minimizing distortion of the reconstructed output signal.

As more fully described hereafter, data compressor 32 is designed to operate on general digital audio data. Thus, in the construction of data compressor 32 no assumptions about the type of audio data were used. Thus, data compressor 32 will work equally well on a wide variety of audio data such as voice, monophonic music, stereo phonic music, and the like. Furthermore, data compressor 32 makes no assumptions about the sampling rate used to generate input data stream 30. Thus, the compression process is independent of sampling rate. Such a feature further extends the utility of data compressor 32.

Returning now to FIG. 2, after the wavelet coefficients have been compressed by compression block 38, the sender transmits the compressed data to a receiver. This is illustrated in FIG. 2 by transmit channel 40. In the alternative, rather than transmitting the compressed audio data, the sender may simply store the compressed audio data for later retrieval. The instant invention is equally applicable to audio data which is transmitted over a bandwidth limited channel and to compression of audio data for compact storage such as might be utilized in a multi-media application.

The decompression process proceeds in the reverse from the compression process just described. Returning now to FIG. 2, the compressed data which has been transmitted over transmit channel 40 or retrieved from a storage location is decompressed by data decompressor 42.

The first step in reconstructing the digital audio signal is to decompress the data. This is illustrated by decompression block 44. The purpose of decompression block 44 is to reverse the lossless compression performed by compression block 38. This decompression will result in reconstruction of a portion of the wavelet coefficients. Because compression block 38 uses a combination of lossless and lossy compression, decompression block 44 can only reverse the lossless compression. The information eliminated in the lossy compression is not recovered.

After the effects of the lossless compression have been reversed by decompression block 44, the next step is to perform an inverse wavelet transform. This is illustrated in FIG. 2 by inverse wavelet transform block 46. Inverse wavelet transform block 46 takes the recovered wavelet coefficients and transforms the data back into the time domain.

Once the data has been transformed back into the time domain, the sole remaining function of data decompressor 44 is to scale the data appropriately. This is illustrated in FIG. 2 by scaling block 48. Although the details of scaling block 48 are discussed more fully hereafter, one function of scaling block 48 is to ensure that the digital audio data is returned to the proper data sample length. For example, if input data stream 30 was comprised of 8 bit or 16 bit data samples, then scaling block 48 would return the time domain data to an 8 bit or 16 bit sample length.

Once the data has been appropriately scaled by scaling block 48, the data is then placed onto output data stream 50. Output data stream 50 thus represents the reconstruction of input data stream 30. The digital data can then be played using methods well known in the art.

Figure 3:
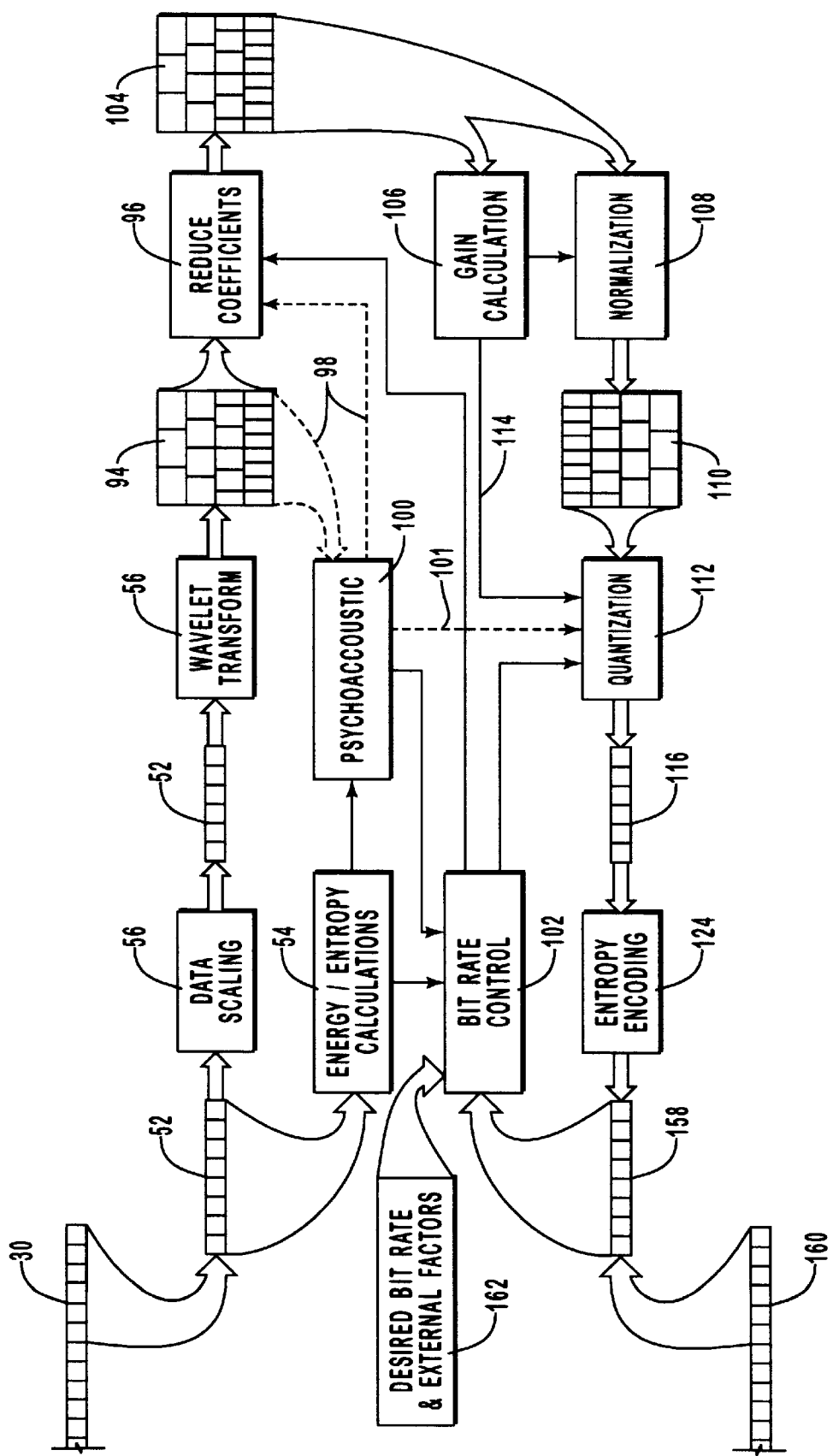
FIG. 3 is a more detailed block diagram of the compression process of the present invention.

Referring now to FIG. 3, a more detailed illustration of data compressor 32 is shown. In the particular embodiment illustrated in FIG. 3, block processing will be presumed. However, as previously discussed, stream processing may also be used.

In conjunction with the block processing, input data stream 30 is first broken down into a plurality of input data frames. The input data frames are then processed sequentially. In practice, this process is usually implemented by first extracting a data frame from the input data stream, processing the data frame, and then returning to the input data stream to extract another data frame. When block processing is used, the input data frames are of a fixed length having $2^n$ data samples. In practice, n is usually between 5 and 12 but could vary over a wide range. The length of the input data frame is not limited by the invention. The only limitation on the length of the input data frame is the capacity of the apparatus used to implement the invention. In the case of an apparatus constructed from discrete components such as shift registers, specialized VLSI chips, and the like, the primary limitation will be the internal length of the data paths such as the shift registers, the storage locations used to store temporary intermediate results, and the like. In the case of an apparatus comprised of a generalized central processing unit or specialized digital signal processing unit along with associated memory, the input data frame length is generally limited by the amount of volatile memory available to store intermediate results during the process. Furthermore, the upper limit on input data frame size will be a function of input data frame processing time and the application. Real time audio transmissions will require receiving compressed signal information often enough to reduce latency. This is most important in two-way voice conversation applications.

Returning now to FIG. 3, as previously indicated the first step is to take from input data stream 30 input data frame 52. In one preferred embodiment, the energy of the input data frame is used in several locations. In such an embodiment, it is preferable that energy calculations be performed on input data frame 52 prior to any other processing. Such energy calculations are illustrated in FIG. 3 by energy/entropy calculation block 54. As those skilled in the art will recognize, however, it is not necessary to calculate the energy from the time domain data samples. Due to the principle of conservation of energy, such a calculation may also be performed on the data samples in the wavelet domain. However, if any scaling of the input data is performed, it is often convenient to perform the energy calculations prior to transformation to the wavelet domain. The energy of the input data frame is calculated according to the following equation:

$$\mathscr{E} = \sqrt{S_1^2 + S_2^2 + \ldots + S_m^2}$$

Where: $\mathscr{E}$ is the energy of the data frame;
$S_i$ is the $i^{th}$ data sample; and
m is $2^n$ which is the total number of data samples in the data frame.

In addition to the energy of the data frame, in some embodiments it may be desirable to utilize the entropy of the data frame in various calculations. In FIG. 3, such an entropy calculation is represented by the energy/entropy calculation block 54. While it is possible to utilize the traditional shannon entropy in various calculations, it is presently preferred in one embodiment to utilize an indirect measure of the entropy. In this embodiment, the indirect entropy measurement is calculated by the equation:

$$E = -\sum_{i=1}^{m} \left(\frac{S_i}{801}\right)^2 \ln\left(\frac{S_i}{801}\right)^2$$

Where: E is the indirect entropy measurement;
$\mathscr{E}$ is the energy in the data frame;
$S_i$ is the $i^{th}$ data sample; and
m is $2^n$ which is the total number of data samples in the data frame.

Returning now to FIG. 3, when input data frame 52 is brought into the data compressor, the data is scaled so that the input data samples lie between −1.0 and +1.0 This step is illustrated by data scaling block 56. Such a data scaling step is not strictly required, but in one preferred embodiment is performed for convenience in processing the data. One main advantage of scaling the data includes providing an interface to the remainder of the compressor that is independent of the sample format of the input data. As an example, most digital audio data comprises either 8 bit or 16 bit data samples. Digital audio data having 8 bits is generally stored in an unsigned fashion with values ranging between 0 and 255. Scaling such data requires removing the dc offset component by substrating 128 and then dividing by 128. Digital data having 16 bits, on the other hand, is generally stored in a signed fashion with values ranging from −32768 to 32767. Thus to scale between −1.0 and +1.0, it is necessary to divide by 32768. In general, in order to scale such input data samples between −1.0 and +1.0, each input data sample is divided by $2^{j-1}$. Where is the number of bits in each data sample. In some cases it is also necessary to remove dc offset values. In FIG. 3, such scaled data is represented by scaled input data frame 58.

As previously discussed, other advantages of scaling may include minimizing roundoff error, minimizing the effect of fixed word length in the data compressor, and allowing the use of fixed point processing rather than floating point processing. Scaling for these effects may require modification of the −1.0 to +1.0 scaling described above. However, scaling for these effects is known in the art and will not be discussed further.

After scaling, the scaled input data frame is transformed into the wavelet domain. This is illustrated in FIG. 3 by wavelet transform block 60. Any wavelet transform can be utilized to perform the wavelet transform. In one preferred embodiment a Daubechics 12 transform is used. It is also presently preferred that the wavelet transform use a standard decomposition tree structure.

Figure 4:
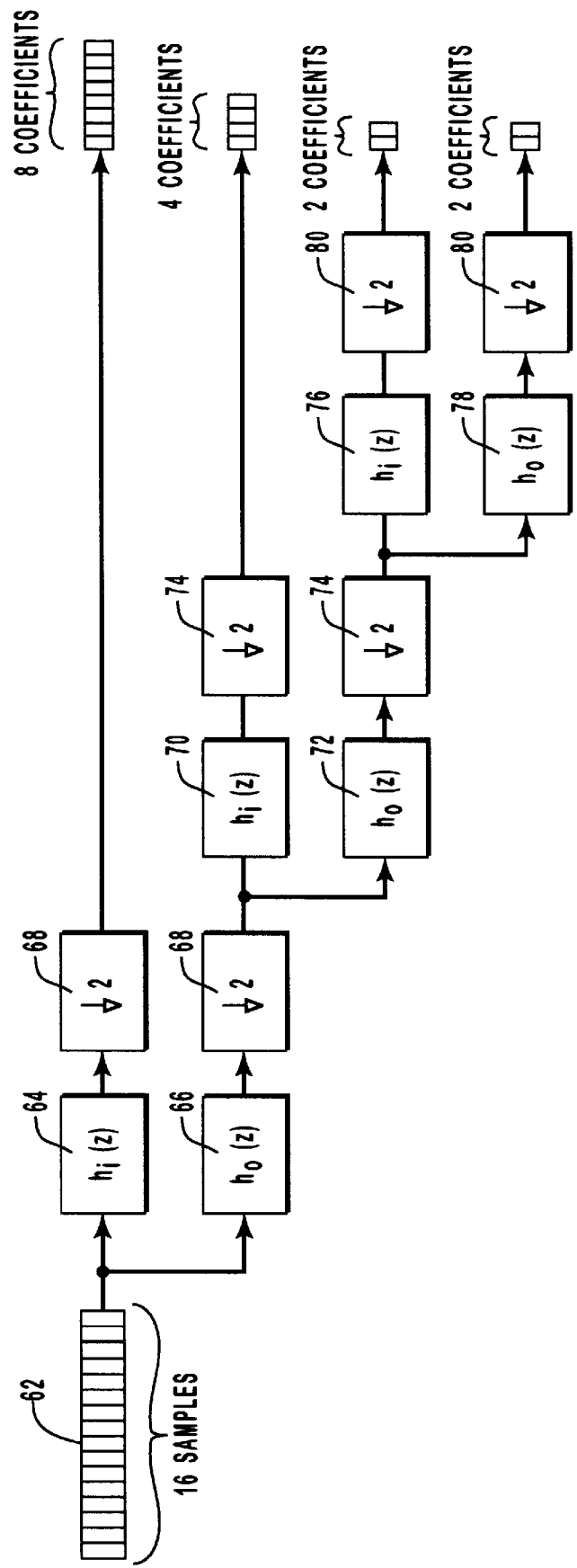
FIG. 4 is an illustrative example of a wavelet transform.

Referring next to FIG. 4, an example of a wavelet transform with a standard decomposition tree structure is illustrated. In general, a wavelet transform transforms time domain data into the wavelet domain. The wavelet transform can be visualized and implemented by a low pass/high pass filter pair which have been matched in a particular way. After filtering, the wavelet coefficients are typically decimated by a factor equal to the number of filter bands. In the case of a high pass/low pass filter pair, this results in decimation by 2. As those skilled in the art will recognize, decimation by 2 means that every other sample is discarded. The high pass/low pass filter pair, and accompanying decimation, can be combined in a tree structure in order to break the signal information down into smaller and smaller wavelet bands. In one preferred embodiment, it is preferred that the low pass filter band be repetitively broken down and decimated until only two wavelet coefficients remain. FIG. 4 contains an example of this process.

In the illustrative example depicted in FIG. 4, the scaled input data frame is presumed to have 16 data samples. This is illustrated in FIG. 4 by scaled input data frame 62. In FIG. 4, the first stage high pass filter is illustrated by high pass filter 64. As illustrated in FIG. 4 filter high pass filter 64 has transfer function $h_1(z)$. The first stage low pass filter is illustrated by low pass filter 66 which has a transfer function of $h_0(z)$. After filtering by high pass filter 64 and low pass filter 66, the signal is decimated by 2. This is represented in FIG. 4 by decimation blocks 68.

After decimation, the output of the high pass wavelet band and the low pass wavelet band will each have 8 wavelet coefficients. As illustrated in FIG. 4, the low pass wavelet band is then cascaded with an identical filtering stage. This filtering stage is represented by high pass filter 70 and low pass filter 72. As illustrated in FIG. 4, high pass filter 70 has the transfer function $h_1(z)$. Low pass filter 72 has the transfer function $h_0(z)$. The output of high pass filter 70 and low pass filter 72 are again decimated by 2 as illustrated by decimation blocks 74. At this point, the output of high pass filter 70 and low pass filter 72 have 4 wavelet coefficients.

Since the number of wavelet coefficients are still above 2 in the lower wavelet band, a final stage is cascaded at the output of low pass filter 72. In FIG. 4, this is illustrated by high pass filter 76 and low pass filter 78. Again, this filtering stage is identical to the previous filtering stages so high pass filter 76 has a transfer function of $h_1(z)$ and low pass filter 78 has a transfer function of $h_0(z)$. Again, the outputs of high pass filter 76 and low pass filter 78 are decimated by 2 as illustrated by decimation blocks 80. After decimation, only two wavelet coefficients remain and so no further filtering stages need be cascaded. As illustrated in FIG. 4, it will take $2^{n-1}$ filtering stages to complete the wavelet transform for a data frame having $2^n$ data samples.

Figure 5:
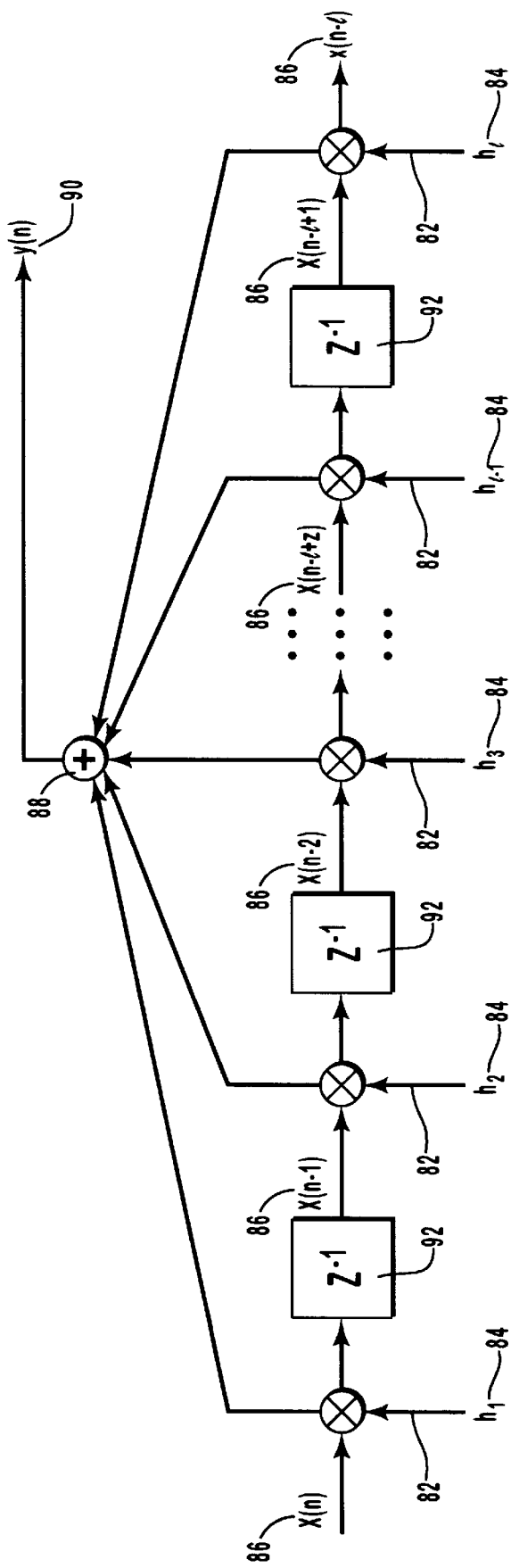
FIG. 5 is a general block diagram of a finite impulse response filter.

Although any wavelet transform can be utilized in this invention, in one preferred embodiment a Daubechies 12 wavelet transform is used. The Daubechies 12 wavelet transform can be accomplished using finite impulse response (FIR) digital filters. An FIR digital filter can be implemented as a weighted tapped delay line. Such an implementation is illustrated in FIG. 5. In FIG. 5, the filter has l stages or taps 82. Taps 82 have applied filter coefficients 84. Filter coefficients 84 multiply data samples 86. The product is then summed by summer 88 to yield final output 90. In FIG. 5, delay stages 92 are inserted between taps 82 to provide the necessary delay. Mathematically, output 90 can be written:

$$y(n) = x(n)h_1 + x(n-1)h_2 + x(n-2)h_3 + \ldots + x(n-l+2)h_{l-1} + x(n-l+1)h_l$$

Where: y(n) is the output of the filter for data sample n;
x(i) is the $i^{th}$ input data sample;
$h_i$ is the $i^{th}$ filter coefficient; and
l is the number of taps in the filter.
This is usually written as:

$$y(n) = x(n) * h(n) = \sum_{k=-\infty}^{\infty} x(k)h(n-k)$$

Where: y(n) is the output of the filter;
x (k) is the $k^{th}$ input data sample;
h (·) is the impulse response of the filter which corresponds to the filter coefficients; and
* is the convolution operator.

From the above description, it will be apparent to those of skill in the art that the FIR filters which comprise the wavelet transform can be implemented either using dedicated hardware or processing means such as a general purpose processor or special purpose digital signal processor. The filter coefficients for the Daubechies 12 wavelet transform are provided in Table 1 below.

TABLE 1

| DAUBECHIES 12 FILTER COEFFICIENTS | |
|---|---|
| LOW PASS FILTER | HIGH PASS FILTER |
| 1.115407433500 E-01 | −1.077301085000 E-03 |
| 4.946238903980 E-01 | −4.777257511000 E-03 |
| 7.511339080210 E-01 | 5.538422010000 E-04 |
| 3.152503517090 E-01 | 3.158203931800 E-02 |
| −2.262646939650 E-01 | 2.752286553000 E-02 |
| −1.297668675670 E-01 | −9.750160558700 E-02 |
| 9.750160558700 E-02 | −1.297668675670 E-01 |
| 2.752286553000 E-02 | 2.262646939650 E-01 |
| −3.158203931800 E-02 | 3.152503517090 E-01 |
| 5.538422010000 E-04 | −7.51 1339080210 E-01 |
| 4.777257511000 E-03 | 4.946238903980 E-01 |
| −1.077301085000 E-03 | −1.115407433500 E-01 |

Returning now to FIG. 3, as previously described the output of the wavelet transform is a set of wavelet coefficients in several wavelet frequency bands. This is represented FIG. 3, by wavelet coefficient map 94. Although, wavelet coefficient map 94 is illustrated in FIG. 3 as a two-dimensional matrix, an apparatus comprising either discrete components or general purpose processing means or special purpose processing means may choose to store the wavelet coefficient map in a wide variety of forms including a single linear array. It is, however, important to be able to identify which wavelet coefficients are associated with which wavelet filter band. Without this information, it is impossible to properly reconstruct the time domain signal from the wavelet coefficients. 24 Before explaining reduce coefficients block 96, it is important to understand factors which influence such reduction. One general characteristic of wavelet coefficients is that the relative importance of the coefficient is, at some level, correlated with its relative magnitude in the coefficient map. This means that relatively small wavelet coefficients can be eliminated without adversely affecting the quality of the reconstructed time domain signal. Magnitude, however, is not the only consideration that must be taken into account when determining whether a particular wavelet coefficient can be eliminated without adversely affecting the quality of the reconstructed audio signal. Other factors which are believed to play a role in quality of the reconstructed signal include the relative location in the wavelet coefficient map, the distribution of wavelet coefficients across the wavelet coefficient map and the type of audio signal being processed. Furthermore, our own research has shown that elimination of more than about 65% to about 75% of the wavelet coefficients can, depending on the type of audio signal being processed, result in significantly degraded quality in the reconstructed audio signal. Thus, this invention realizes that many different factors can influence the perceived quality of the reconstructed audio signal.

Since one of the primary goals of this invention is to reduce the number of bits required to store or transmit a digital audio signal without significantly degrading the is perceived quality of the reconstructed digital audio signal, care is taken to eliminate coefficients in such a way as to minimize the impact on perceived quality of the reconstructed digital audio signal. Thus, the next step in FIG. 3 is to eliminate less important wavelet coefficients. This is illustrated in FIG. 3 by reduce coefficients block 96. In reduce coefficients block 96, wavelet coefficients are eliminated according to several criteria. According to one aspect of the present invention, it is possible to eliminate coefficients which fall below the perceptional threshold of an individual's hearing. In other words, certain coefficients are of such minimal magnitude that they fall below the ability of the human ear to perceive. In addition, strong audio signals may mask weaker audio signals located in close proximity to the strong audio signal. Thus, in one preferred embodiment, reduced coefficients block 96 utilizes a quiet threshold which eliminates all wavelet coefficients below the quiet threshold.

The quiet threshold may be derived in a wide variety of ways. In one preferred embodiment, the quiet threshold represents an a priori estimate of the perceptional threshold of an individual ear. Such a perceptional threshold may be based on empirically gathered scientific evidence or may be based on other factors such as the amount of noise added into the digital audio signal during digitizing or other processing which has occurred prior to the compression of the signal in this data compressor. Rather than a fixed threshold based on an a priori estimate, the quiet threshold may also be calculated based on the current data frame. In other words, based on the energy, entropy, or other characteristics of the current data frame, the quiet threshold may be derived. Derivation of this quiet threshold may also be based on a psychoacoustic model of human hearing perception. Such a possibility is represented in FIG. 3 by phantom lines 98 leading into and out of psychoacoustic block 100.

An important feature of the present invention is the ability to adjust or adapt the average bit rate of the data compressor in order to meet a required average bit rate. As used within the scope of this invention, bit rate refers to the number of bits output from the data compressor in a given period of time. This terminology is derived from the fact that one contemplated use of the inventive data compressor is to reduce the number of bits required to represent a digital audio data stream so that the digital audio data stream can be transmitted over a bandwidth limited communication channel. Bandwidth limited communication channels currently exist in many applications. For example, it may desired to transmit high-quality audio information over a standard 14.4 kbps modem or 28.8 kbps modem such as when audio information is transferred over telephone lines from the Internet to a user's computer.

This instant invention is not so limited, however. The present invention is also useful in reducing the number of bits used to represent a digital audio signal which needs to be stored for later retrieval. Such an application may be encountered where multi-media audio clips are stored on computer readable media for later retrieval and playing. In such an application, there will be an inherent tradeoff between the compressed size of the audio data and the quality of the reconstructed audio data. However, in order to squeeze the maximum amount of information on a single copy of computer readable media, it may be desirable to allocate an amount of storage to each portion of information. Although the term bit rate is used throughout this application, such a term should not be construed to limit the scope of this invention to applications where data is transmitted over a bandwidth limited communication channel. The term should be read to encompass a general measure of the number of bits used to represent the compressed audio signal.

In order to achieve the objective of matching the bit rate out of the compressor to the capacity of a bandwidth limited channel, the invention comprises means to adaptively control the bit rate. In FIG. 3, such means to adaptively control the bit rate is illustrated by bit rate control block 102. Although the details of bit rate control block 102 are presented hereafter, at this point it is important to understand that the bit rate control block plays a is central role in determining how many wavelet coefficients are eliminated by reduce coefficients block 96. As previously described, the first function of reduce coefficients block 96 is to eliminate all coefficients below the quiet threshold. In addition, however, reduce wavelet coefficients block 96 will also eliminate further wavelet coefficients until a specified fractional percentage of all wavelet coefficients have been eliminated. As more fully described hereafter, elimination of wavelet coefficients translates indirectly into a reduced number of bits needed to represent the audio data.

As previously discussed, the relative magnitude of a wavelet coefficient is related to the relative importance of that coefficient. Thus, if a specified fractional percentage of wavelet coefficients are to be eliminated, it is important to eliminate coefficients beginning with the least important coefficients. While a wide variety of coefficient attributes can be taken into account when deciding which coefficients to eliminate, in one preferred embodiment coefficients with a smaller magnitude are eliminated first. In order to facilitate such a procedure, the wavelet coefficients in wavelet coefficient map 94 can be sorted in a monotonically increasing arrangement. Once this occurs, it is a simple procedure to eliminate all coefficients up to a specified fractional percentage of the total number of coefficients. Elimination of coefficients proceeds according to magnitude without regard to sign. Thus all sorting and elimination processes use magnitude without regard to the sign of the coefficient. Such a scheme guarantees that coefficients which have a smaller magnitude are eliminated first.

If however, the wavelet coefficients in wavelet coefficient map 94 are sorted in a monotonically increasing fashion, it is important to be able to reverse the sorting and replace the remaining coefficients in their proper location in wavelet coefficient map 94. Without this ability, it will be impossible to reconstruct the input signal.

Throughout the above discussion, reference was made to eliminating wavelet coefficients. Such a procedure can be accomplished simply be zeroing a given wavelet coefficient. This procedure effectively eliminates the coefficient from wavelet coefficient map 94.

After wavelet coefficient map 94 has been processed and the desired fractional percent of wavelet coefficients eliminated by reduce coefficient block 96, reduced wavelet coefficient map 104 results. The next step in the compressor is to calculate a gain for reduced wavelet coefficient map 104. In FIG. 3, this process is illustrated by gain calculation block 106. In one preferred embodiment, the gain is calculated as a filtered estimate of the maximum coefficient magnitude in reduced wavelet coefficient map 104.

In one preferred embodiment, the gain is calculated according to the following sequence of steps:

1. If the old gain value is less than the maximum coefficient of reduced wavelet coefficient map 104, then set the current gain estimate to the maximum coefficient magnitude from reduced coefficient map 104. Mathematically:

$$G_n = C_{max}$$

Where: $G_n$ is the current gain estimate; and
$C_{max}$ if the maximum wavelet coefficient magnitude in reduced wavelet coefficient map 104.

2. If the last estimate of the gain is greater than or equal to the maximum coefficient value from reduced wavelet coefficient map 104, then calculate the gain according to the equation:

$$G_n = G_{n-1} + \alpha(C_{max} - G_{n-1})$$

Where $G_n$ is the current gain estimate;
$G_{n-1}$ is the previous gain estimate;
$C_{max}$ is the maximum wavelet coefficient magnitude in reduced wavelet coefficient map 104; and
$\alpha$ is a smoothing coefficient.

3. In either case, clip the gain so that it remains in the range:

$$G_{min} \leq G_n \leq G_{max}$$

Where $G_n$ is the current gain estimate;
$G_{min}$ is the minimum allowable gain; and
$G_{max}$ is the maximum allowable gain.

4. Quantize the gain at a selected quantization level. An examination of the above-described gain calculation method reveals the following characteristics:

First, if the maximum coefficient in reduced wavelet coefficient map 104 is larger than the gain from the previous data frame, then this is an indication that the signal amplitude in one or more wavelet coefficient bins is increasing in magnitude. The above algorithm will allow the gain to increase as rapidly as possible. This is important because limiting the rate of increase may introduce distortion into the signal.

Next, if the maximum coefficient in reduced wavelet coefficient map 104 is not greater than the previous gain, this indicates that the wavelet coefficient magnitudes in this map are smaller than (or equal to) the gain from the previous map. Research has shown that in such a situation, rather than let the gain decrease too rapidly, it is better to smoothly decrease the gain. Such an implementation can take advantage of the characteristics of successive data frames to provide additional compression through small signal suppression effects.

When a data frame having large coefficient magnitudes is followed by a data frame having small coefficient magnitudes, the data frame having small magnitudes will tend to be masked perceptually by the preceding data frame having large coefficient magnitudes. If the gain for the data frame having small coefficient magnitudes is held at a higher value than would be indicated by the maximum coefficient magnitude in the data frame, many of the smaller coefficient values in the data frame will be suppressed to the point that when they are quantized by quantization block 112, they will be quantized to zero. Thus, such an implementation has the effect of eliminating more coefficient values than would otherwise by eliminated by reduce coefficient block 96 while still retaining the more important coefficients. As previously stated, such elimination is possible without introducing perceived distortion because of the masking effect of the prior data frame containing large coefficient magnitudes. Obviously the number of coefficients which can be eliminated without introducing perceptible distortion into the signal is a function of the degree of masking achieved by the previous frame.

Those skilled in the art will recognize the gain calculation according to step two above represents an alpha smoothing filter. For such a filter to have a smoothing effect, alpha is set to be less than 1. The smaller the value of alpha, the longer it will take for the gain to decrease to a falling level. Research has indicated that alpha values between 0.1 and about 0.001 give good all around performance.

The gain is then clipped so that it will not fall below a specified minimum nor rise above a specified maximum. This is important because as described hereafter, the gain value will be quantized. If the gain value falls below the lowest quantization level, the gain will be quantized to zero and during reconstruction of reduced wavelet map 104, all wavelet coefficients will be eliminated by multiplying them by a zero gain value. On the other hand, if the gain is allowed to rise above the maximum quantization level, distortion will be introduced in the reconstructed output signal due to the limiting effect the gain quantization will have.

Finally, the gain value is quantized at a selected quantization level. In some embodiments, the quantization level will be fixed throughout the compression process. In other embodiments the quantization level will vary. In either case, it is important to select a quantization level having a sufficient number of bits so that distortion due to quantization noise is held within the desired perception levels.

After the gain has been calculated and quantized, the value is fed down into normalization block 108 which normalizes wavelet coefficient map 104 by dividing each wavelet coefficient by the gain to produce normalized coefficient map 110.

After normalized wavelet coefficient map 110 has been generated, normalized wavelet coefficient map 110 is then quantized. This is illustrated in FIG. 3 by quantization block 112. The basic purpose of quantization block 110 is to represent each of the normalized wavelet coefficients in normalized wavelet coefficient map 110 by a specified number of bits.

Quantization of the wavelet coefficients is described next. In one preferred embodiment, quantization block 112 quantizes the individual wavelet coefficients of normalized wavelet coefficient map 110 based on a selected quantization level calculated by bit rate control block 102. The specific details of how bit rate control block 102 calculates the desired quantization level is presented later. For a complete understanding of quantization block 112, however, it is necessary to understand that in some embodiments all wavelet coefficients in normalized wavelet coefficient map 110 are quantized using the same number of bits. In other words, in these embodiments the same number of bits are used to represent each wavelet coefficient in normalized wavelet coefficient map 110. In further embodiments, the wavelet coefficients in normalized wavelet coefficient map 110 are quantized according to a specified criteria. In such embodiments, the number of bits allocated and used to represent each wavelet coefficient in normalized wavelet coefficient map 110 may vary based on specific parameters of the wavelet coefficients in normalized wavelet coefficient map 110. In such an embodiment it may also be desirable to use a psychoacoustic model to help determine the quantization level of each coefficient.

The act of quantizing the wavelet coefficients in normalized wavelet coefficient map 110 introduces quantization noise into the digital audio data. Therefore, when calculating the number of bits used to represent a particular wavelet coefficient, care must be taken not to introduce quantization noise which begins to distort the compressed signal in a noticeable manner. The details of this determination are presented when the bit rate control block is discussed later.

Figure 6:
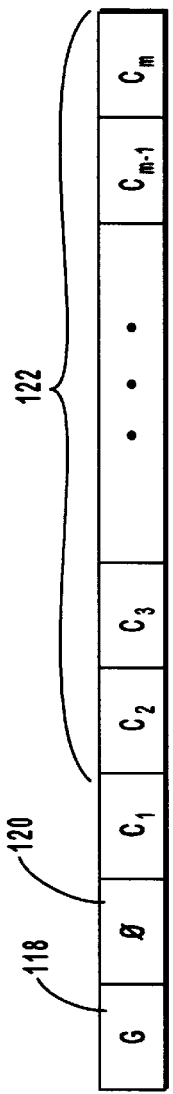
FIG. 6 is the output data frame of one preferred embodiment.

The final purpose of quantization block 112 is to begin assembling the information that will be included in the output data frame in the proper sequence. This is represented in FIG. 3 by output data frame 116. Output data frame 116 is more clearly illustrated in FIG. 6. As depicted in FIG. 6, the first piece of information included in output data frame 116 is gain 118. Gain 118 is the quantized value of the gain which was calculated in gain calculation block 106. Thus conceptually the quantized value of the gain calculated in gain calculation block 106 must be passed into output data frame 116. In FIG. 3 this is illustrated by line 114.

Rather than the individual wavelet coefficient quantization described above, other embodiments use vector quantization. In its simplest form, vector quantization quantizes groups or vectors of coefficients such that some specified error criteria is minimized. In an embodiment using vector quantization, quantization block 112 would first separate normalized wavelet coefficient map 110 into groups of coefficients called vectors according to some predetermined criteria. In one embodiment, such criteria may be to divide normalized wavelet coefficient map 110 into a predetermined number of vectors each having an equal number of coefficients. In another embodiment, such criteria may be to divide normalized wavelet coefficient map 110 into vectors which correspond to individual or groups of wavelet bands. In this embodiment each vector may have a different number of coefficients.

After normalized wavelet coefficient map 110 has been divided into vectors, each vector is replaced by a quantized vector from a quantized vector codebook. The vector selected from quantized vector codebook is chosen so as to minimize the error between the selected quantized vector and the original unquantized vector. Many different error measures can be used, but most error measures are some variant at an RMS error measure.

In embodiments which use vector quantization, it may be desirable to modify other portions of the data compressor. For example, because of the way in which vector quantization works, it may be desirable to modify reduce coefficients block 96 in order to match the way in which coefficients are eliminated to the vector quantization process It is presently believed that by carefully selecting the criteria used to eliminate coefficients in reduce coefficients block 96 and matching the criteria to the vector quantization implementation, increased compression performance can be achieved. In such an implementation it may be desirable to dynamically trade off various parameters of the coefficient elimination criteria and the vector quantization implementation. For example, it may be desirable to eliminate coefficients and divide normalized wavelet coefficient map 110 in such a way as to maximize the number of vectors containing all zero coefficients.

In still other embodiments, different methods of selecting quantized vector codebooks may be used. For example, in one embodiment a single quantized vector codebook may be used for all vectors. In other embodiments a plurality of quantized vector codebooks may be used. In such embodiments various criteria can be used to select the appropriate quantized vector codebook. For example, the quantized vector codebook may be chosen based on the wavelet frequency band.

Returning now to FIG. 6, in output data frame 116 gain 118 is followed by quantization level 120. Quantization level 120 is the number of bits used to quantize the wavelet coefficients in normalized wavelet coefficient map 110. Following quantization level 120 are the quantized wavelet coefficients from normalized wavelet coefficient map 110. This is illustrated in FIG. 6 by the blocks labeled 122.

As illustrated in FIG. 6, all m coefficients are included in output data frame 116. This includes the coefficients which have been eliminated by setting their value to zero. As previously discussed, it is important to be able to place the coefficients in their proper location within the wavelet coefficient map. Therefore, when a data decompressor eventually reconstructs a wavelet coefficient map from output data frame 116, the compressor must be able to ascertain all coefficients locations. While it would be possible to eliminated the zero coefficients and transmit only coefficients having a non-zero value, this would necessitate transmitting a coordinate location within the wavelet coefficient map so that the coefficient could be placed in the proper location. Although such embodiments are contemplated within the scope of this invention, currently it is preferred to keep the eliminated coefficients as place holders in order to allow rapid reconstruction of wavelet coefficient map. Such an approach incurs no penalty and, in fact, is believed to be the best general way of preserving wavelet coefficient location information within output data frame 116. The reason no performance penalty is incurred is because of an efficient entropy encoding method used within the data compressor.

After output data frame 116 has been assembled, it will be apparent from the previous discussion that output data frame 116 contains a large amount of redundant information. This redundant information can be eliminated effectively with entropy encoding methods. In FIG. 3, these entropy encoding methods are illustrated by entropy encoding block 124. Although any conventional entropy encoding method will remove some of the redundancy in output data frame 116, significant effort has been expended in determining the types of redundancy in output data frame 116 and developing specific entropy encoding methods to remove that redundancy.

Entropy encoding methods can be broken down into two broad categories, those using fixed codebooks and those using adaptive codebooks. In selecting an entropy encoding method, several factors should be considered. The first consideration in selecting an entropy encoding method should be the environment in which the data compressor is operating. For example, if the data compressor is operating in an environment where all data receivers are guaranteed to receive the beginning of each audio data stream and all data compressed with the data compressor, then perhaps entropy encoding methods utilizing adaptive codebooks may be a viable alternative. One general problem which exists when adaptive codebooks are used is synchronization of the codebooks between the data compressor, which is usually associated with a data transmitter, and a data decompressor, which is usually associated with the data receiver. Because codebooks in adaptive entropy encoding methods evolve over time and the current state of the codebook is dependent on all previous data which has been compressed, in order to decompress the data, the data compressor must begin at the same place the data compressor began and receive all data which has been compressed by the compressor so that the codebook in the data decompressor evolves in the same manner as the codebook in the data compressor.

There are other ways to synchronize codebooks between a data compressor and a data decompressor, but these methods are generally limited to a specific type of environment or communication protocol. For example, if a data receiver is going to start receiving data from a data compressor, the data compressor could first transmit the present state of the codebook followed by compressed data. Unfortunately, this necessitates transmitting a potentially large codebook. If the communication channel is bandwidth limited, this may not be a viable alternative. Although the preceding discussion has taken place in the context of data transmitted between a data transmitter and a data receiver, the same considerations apply between data which has been compressed and stored for later retrieval by a data decompressor.

In selecting an entropy encoding method for use with the data compressor, other considerations include the length of the data stream to be compressed, the type of data to be compressed, and the local and global statistics of the data to be compressed. If the data streams which are to be compressed are relatively short, adaptive codebook entropy encoding methods are generally less efficient. This is because in an adaptive codebook method, the codebook must be trained and adapted to the statistics of the data being compressed. In the initial stages of compression, the codebooks tend to be very inefficient. In order to effectively utilize adaptive codebook methods, the data stream must be long enough to allow the codebook to evolve to an efficient state. The type of data being compressed as well as the local and global statistics of such data are important because this will indicate how efficient various types of entropy encoding methods are.

In one preferred embodiment a entropy encoding method has been developed which takes advantage of the statistics of a single data frame, as well as the statistics of many successive data frames. The coding method which is preferred in one embodiment is a coding method based on a combination of multiple Huffman encoders and a run length encoder. In one preferred embodiment adaptive codebooks are used. In another preferred embodiment, fixed codebooks are used. These individual methods are known to those of skill in the art. The discussion which follows will therefore focus on the unique combination of these methods developed for use with the present invention.

Figure 7:
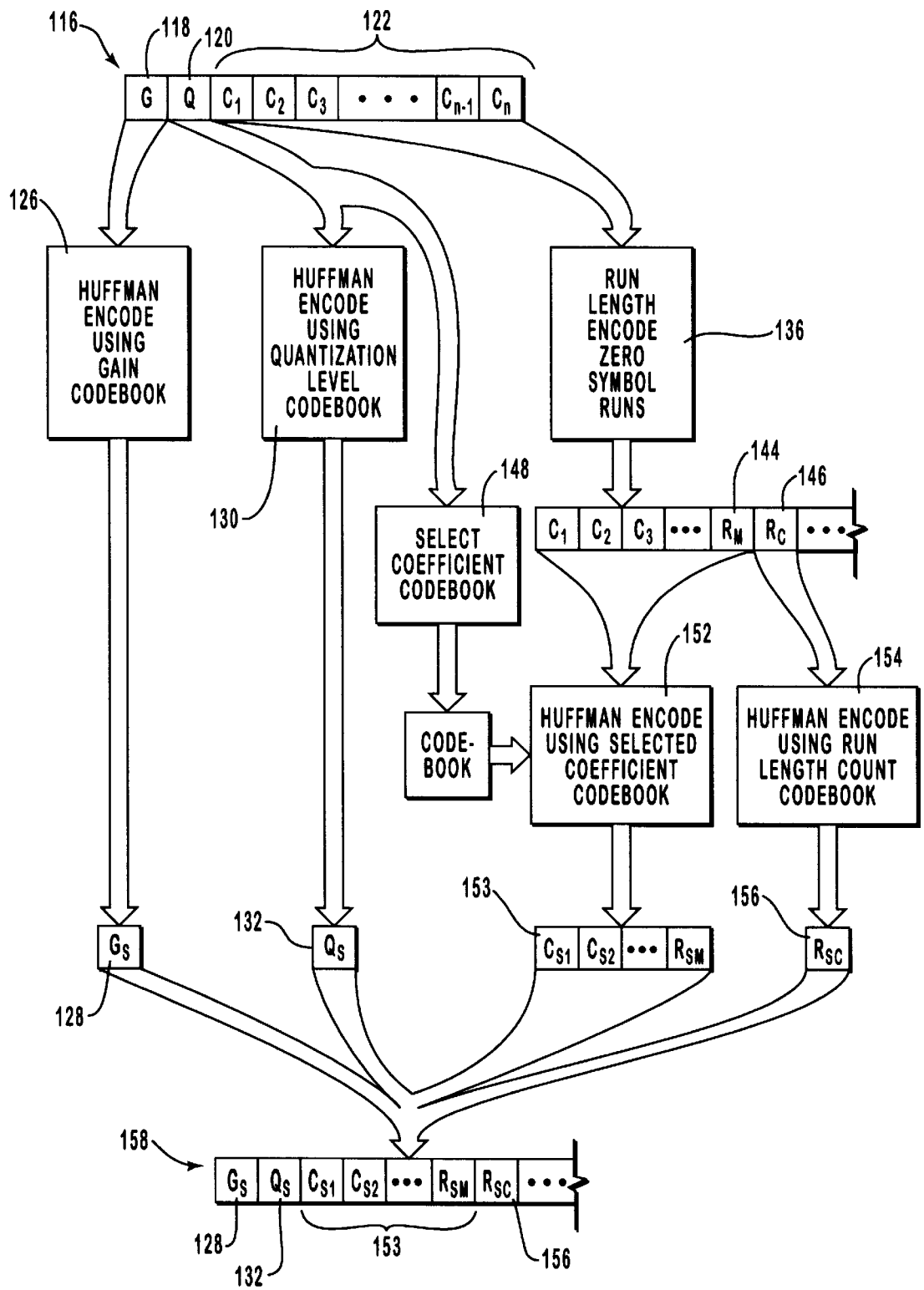
FIG. 7 is a diagram illustrating entropy encoding of one preferred embodiment.

The inventive encoder is illustrated in FIG. 7. An examination of output data frame 116 in FIG. 6 will show that an output data frame comprises a gain value, a quantization level value, and a plurality of wavelet coefficients. Many of the wavelet coefficients have been eliminated and set to a zero value. Referring now to FIG. 7, the basic structure of the entropy encoder is presented. As illustrated therein, a plurality of codebooks are used. In FIG. 7, the gain is first compressed by Huffman encoding the gain using a gain codebook. This is illustrated in FIG. 7 by Huffman encoding block 126. As illustrated in FIG. 7, gain 1 18 is encoded by replacing gain 118 with the corresponding symbol found in the gain codebook. The encoded gain symbol is illustrated in FIG. 7 by gain symbol 128.

Similar to the process of encoding the gain, quantization level 120 is Huffman encoded using a quantization level codebook. This is illustrated in FIG. 7 by Huffman encoding block 130. As illustrated in FIG. 7, quantization level 120 is replaced by quantization level symbol 132.

Figure 8:
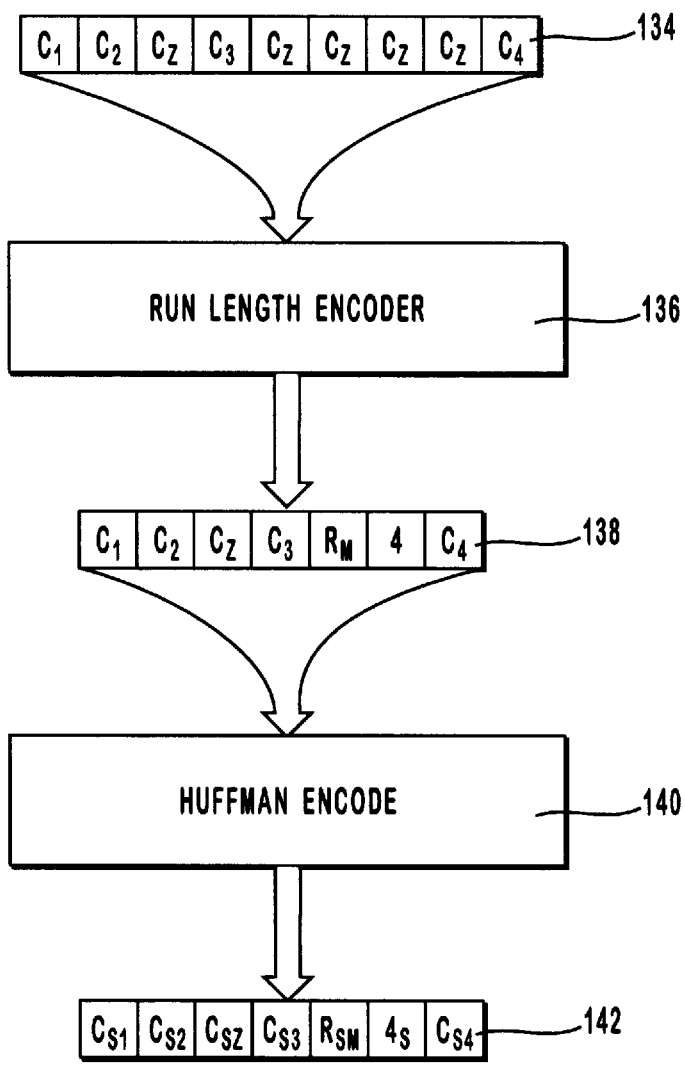
FIG. 8 is a diagram illustrating entropy encoding wavelet coefficients of one preferred embodiment.

Finally, the quantized wavelet coefficients found in output data frame 116 are encoded using a combination of run length encoding and Huffman encoding. This process is generally illustrated in FIG. 8, In FIG. 8, quantized coefficients 134 are first encoded by run length encoder 136. Run length encoder 136 is slightly different from a standard run length encoder. Run length encoder 136 only run lengths encodes coefficients which have been eliminated. In other words, run length encoder 136 encodes coefficients which have a zero value. Referring to FIG. 8, an example sequence of coefficients is $C_1$ $C_2$ $C_z$ $C_3$ $C_z$ $C_z$ $C_z$ $C_z$ $C_4$. In this sequence $C_i$ represents a coefficient having a non zero value and $C_z$ represents a coefficient having a zero value. As illustrated in FIG. 8, run length encoder 136 will encode the run of four consecutive zero coefficients to yield the sequence $C_1$ $C_2$ $C_z$ $C_3$ $R_m$ 4 $C_4$. This is run length encoded sequence 138 in FIG. 8. In this sequence, the run of four zero symbols, $C_z$, have been replaced by $R_m$ which represents a run length marker and the number 4 which indicates the length of the run of zero symbols. As previously mentioned, run length encoder 136 will only encode runs of zero coefficients. If runs of other coefficients appear, run length encoder 136 will pass the coefficients unencoded.

After quantized coefficients 134 have been encoded by run length encoder 136 to yield run length encoded sequence 138, run length sequence 138 is next encoded by Huffman encoding. This is illustrated in FIG. 8 by Huffman encoder block 140. Although Huffman encoding block 140 utilizes a plurality of codebooks to encode run length encoded sequence 138, conceptually, each coefficient in run length encoded sequence 138, including any run length markers, $R_m$, and run length counts which follow the run length markers, are encoded by replacing them with the appropriate symbol from the appropriate codebook. In FIG. 8, the output of Huffman encoding block 140 is represented by Huffman encoded sequence 142. As illustrated in FIG. 8, coefficient $C_1$ has been replaced by coefficient symbol $C_{s1}$, coefficient $C_2$ is replaced by coefficient symbol $C_{s2}$, and so forth.

Returning now to FIG. 7, a more detailed illustration of how coefficient sequence 122 is encoded is illustrated. As illustrated in FIG. 7, coefficient sequence 122 is first encoded using run length encoder 136 as previously described. As previously described, run length encoder 136 will replace a run of zero coefficients with run length marker 144 and run length count 146. As those skilled in the art will recognize, run length marker is a special symbol designed to alert the entropy decoder to insert a run of zero symbols. Run length count 146 then informs the run length decoder how many zero symbols should be inserted. From this description it becomes obvious that only runs of two or more symbols should be encoded in this method. Run length encoder 136 operates in this manner.

After coefficient sequence 122 has been run length encoded, the next step is to encode the remaining coefficients, including any run length markers and run length counts, using Huffman encoding. In one preferred embodiment, a single codebook can be used to encode all of these values. In another preferred embodiment, the coefficients and run length markers are encoded using one codebook and the run length counts are encoded using a separate codebook. In yet another embodiment, separate coefficient codebooks are kept for each different quantization level. This is the embodiment illustrated in FIG. 7.

If multiple codebooks are used to encode coefficients based on the number of quantization bits which are used to quantize the coefficients, means to select an appropriate codebook must be included. In FIG. 7, such means as illustrated by select coefficient codebook block 148. As illustrated in FIG. 7, select coefficient codebook block 148 receives quantization level 120, selects an appropriate coefficient codebook 150, and passes the appropriate codebook to Huffman encoding block 152.

As further illustrated in FIG. 7, all coefficients are encoded using the selected coefficient codebook. This encoding includes any run length markers 144. In one preferred embodiment, however, the run length count associated with any run length marker is encoded using a separate run count codebook. This is illustrated in FIG. 7 where run length count 146 is encoded by Huffman encoding block 154 to produce run count symbol 156.

After all data in output data frame 116 has been encoded with the appropriate symbols, the data is assembled into encoded output data frame 158. This encoded output data frame is then transmitted across the communication channel to the data receiver or is stored for later retrieval. In FIG. 3, this process is illustrated by compressed data stream 160. By running compressed data stream through an appropriate decompressor, a reconstructed version of input data stream 30 can be obtained. The process of decompression is discussed below.

Returning now to FIG. 3, a more detailed description of bit rate control block 102 is presented. As previously mentioned, an important aspect of the present invention is the ability adaptively vary the data rate coming out of the data compressor. This process is achieved primarily by a feedback control loop illustrated by bit rate control block 102 in FIG. 3. The operation of the bit rate control block 102 allows the data rate to be varied as often as data frame to data frame in order to achieve a desired average bit rate. On the other hand, bit rate control block 102 can be set to vary the data rate less often if desired.

A wide variety of technologies can be utilized to implement bit rate control 102. By way of example, and not limitation, these technologies comprise various filtering and estimation loops such as alpha filters, alpha-beta filters, alpha-beta-gamma filters, Kalman filters, or any other optimal or sub-optimal filtering technologies. Additionally, technologies used to implement bit rate control block 102 may also comprise various neural network implementations.

Depending on the particular implementation selected, the output bit rate will have various characteristics. Such characteristics will include the ability of bit rate control block 102 to adapt to various external factors. For example, one application envisioned for this invention involves the simultaneous transmission of voice and data. Assuming that the data is provided by a separate device, the instant invention could be used to compress the voice to transmit it with the data. Assuming that the voice and data information are to be transmitted over a bandwidth limited communication channel, and depending on the amount of data being generated, a situation can arise where the amount of data being transmitted can fluctuate over time. This will create excess channel capacity which allows voice data to be transmitted on an interleaved basis with the data. In such a situation, the voice data would be presented with a communication channel which has a time varying bandwidth capacity. In such an environment, in one instant of time a large communication channel capacity may be available while at a second instant of time only a minimal or marginal communication channel capacity would be available. A compressor such as the one illustrated in FIG. 3 could adaptively vary the number of bits output from the compressor to match available communication channel capacity or allowable data bit rate. The type of technology selected for bit rate control block 102 will influence the ability of a compressor such as one illustrated in FIG. 3 to adapt to varying channel bandwidth capabilities or allowable data bit rate.

In order to illustrate some of the embodiments available for bit rate control block 102, the following embodiments are given by way of example and not limitation. In one embodiment, the bit rate control block 102 will calculate the fractional percentage of coefficients which should be eliminated in the data frame by reduced coefficients block 96 based on a comparison between a desired average bit rate and the number of data bits transmitted last frame. Such an embodiment can be mathematically implemented by first calculating an error measurement between the number of bits transmitted last frame and a desired number of bits to be transmitted. The calculated fraction of coefficients to be eliminated is then calculated as a filtered estimate using this error. Mathematically, first calculate the error as:

$$\epsilon = \frac{B_t - B_s}{B_s}$$

Where: $\epsilon$ is the normalized error;
$B_t$ is the number of bits transmitted or stored last data frame; and
$B_s$ is the desired number of bits per data frame (the setpoint).

The fraction of coefficients which should be eliminated from the current data frame is then given as:

$$F_n = F_{n-1} + \alpha_f \epsilon$$

Where: $F_n$ is the fraction of coefficients which should be eliminated this frame;
$F_{n-1}$ is the fraction of coefficients which were eliminated last frame;
$\alpha_f$ is a smoothing coefficient; and
$\epsilon$ is the normalized error calculated above.

Those skilled in the art will recognize that the above equation is an alpha smoothing filter. As previously discussed, $\alpha_f$ is a smoothing coefficient which is generally less than 1. Furthermore, the smaller that $\alpha_f$ becomes the more heavily smoothed the fraction $F_n$ will be. Such an alpha filter works reasonably well when the communication channel bandwidth varies in a smooth or slowly varying way. For these types of communication channels, research has found that $\alpha_f$ values between about 0.1 and about 0.001 work reasonably well. Those skilled in the art will recognize that the particular $\alpha_f$ value which works the best will depend solely on how the channel bandwidth fluctuates. In applications where the channel bandwidth is a fixed constant or relatively fixed constant, it is typically desired to set $\alpha_f$ to a reasonably smaller number toward the lower end of the range given.

If the communication channel capacity fluctuates in a step-wise manner, for instance oscillating between a relatively large value and a relatively small value, it may be desirable to have $\alpha_f$ be a time-varying quantity. In other words, it may be desirable to keep $\alpha_f$ at a relatively small value when the channel capacity is constant, or nearly so, and when the channel capacity changes by a large amount, set $\alpha_f$ to a relatively large value in order to allow the data compressor to match the number of bits being sent to the channel capacity in a relatively short period of time. After the compressor has matched the number of bits being transmitted to the channel capacity, $\alpha_f$ can then be set to a small value again.

If the channel capacity fluctuates in an unpredictable manner remaining at a specified value for only a very short period of time, it may be desirable to replace the alpha filter described above with a more sophisticated filtering system. Those skilled in the art will recognize that the field of filtering and estimation is vast with many types of filters including alpha-beta filters, alpha-beta-gamma filters, Kalman filters, and the like. Each of these filters trades off computing time for a more sophisticated model which can account for various types of fluctuations. Typically, these filters involve not only estimation of the parameter or parameters desired, but a limited prediction ability which attempts to predict what the future value of a particular parameter might be.

In addition to conventional filtering technology, many advanced technologies may also be used in bit rate control block 102. One potential technology which may hold promise for communication channels which have fluctuating band widths, is neural network technology. Neural network technology devises structures which attempt or mimic various aspects of the human neural system. Such technologies have shown promise in estimating or predicting various quantities. Neural network technology can therefore be applied to bit rate control block 102.

As illustrated in FIG. 3, psychoacoustic block 100 provides an input to bit rate control block 102. As previously explained, psychoacoustic block 100 contains a psychoacoustic model which can take into account human perceptional abilities. The psychoacoustic model must be custom tailored to the type of sensory data being processed. Thus, a compressor for visual data will have a different psychoacoustic model than a compressor for audio data. The psychoacoustic model allows information which cannot be perceived by a human being to be eliminated from the signal. In one preferred embodiment, psychoacoustic block 100 calculates the quantization level which will be used in quantization block 112 to quantize normalized wavelet coefficient map 110. In such an embodiment, the output of psychoacoustic block 100 may be fed directly into quantization block 112 as illustrated by phantom line 101.

Although psychoacoustic models have been developed, our own research has shown that human sensitivity to quantization noise introduced by quantization block 112 is related to the energy-entropy product of input data frame 52. The higher the entropy-energy product, the larger the tolerance for quantization noise and the fewer the number of bits that lo can be used in representing the wavelet coefficients without perceptible distortion of the signal. In one embodiment, the energy-entropy product is compared to a range of thresholds and the quantization level is selected based on the energy-entropy product. In this model, entropy refers to the indirect entropy measurement E, the calculation of which has been previously described. In other words, if the energy-entropy product is less than a first threshold then a first quantization level is selected. If the energy-entropy product is less than a second threshold then a second quantization level is selected. This process can be continued to provide an appropriate number of quantization levels.

Although the above method of selecting the quantization level proves satisfactory in applications where sufficient communication bandwidth is available, in communication channels where the bandwidth is severely restricted, our own research indicates that lower perceived distortion will be realized by allowing bit rate control block 102 to dynamically trade off the quantization level used in quantization block 112 and the fractional percentage of coefficients which are eliminated in reduce coefficients block 96. The general concept behind this approach is that as the fractional percentage of coefficients which are eliminated is increased, the number of bits which can be allocated to quantize the remaining coefficients can be increased assuming a fixed communication channel capacity. Our research has shown that human perception of the quality of the reconstructed audio signal is based not only on the quantization noise introduced by quantization block 112 but also by the number of coefficients which have been eliminated in reduce coefficients block 96. Although the number of coefficients which can be eliminated by reduce coefficient block 96 without severe distortion of the signal varies according to the type of audio information compressed, in general if the number of coefficients eliminated exceeds between about 65% to about 75%, perceptible distortion of the audio signal results. In such a situation, it is typically preferred to lower the number of bits used to represent the coefficients in quantization block 112 and eliminate fewer coefficients in reduced coefficient block 96.

Returning now to FIG. 3, structure to implement such a process is illustrated. In FIG. 3, the output of psychoacoustic block 100 is fed into bit rate control block 102. Bit rate control block 102 then provides both the fractional percentage of coefficients which should be eliminated to reduce coefficients block 96 and the quantization level which should be used to quantization block 112. If bit rate control block 102 determines that the fractional percentage of coefficients which should be eliminated is exceeding between about 65% to about 75%, bit rate control block 102 can override the calculated quantization level from psychoacoustic block 100 and decrease the number of bits used to represent the coefficients. The increased quantization level is then passed to quantization block 112 and the fractional percentage of coefficients which should be eliminated from this frame is preferably reduced in order to bring it below about 65%. The number of bits actually transmitted in encoded output data frame 158 can then be compared to the desired number of bits transmitted in order to determine if the quantization level has been set at a sufficiently high level. In such an embodiment, it may be desirable to create an alpha filter or other estimation filter for the quantization level. In addition, it maybe desirable to create a more sophisticated filter which can model the trade-off between quantization level provided to quantization block 112 and the fractional number of coefficients which must be eliminated in reduce coefficients block 96. Such a cross-coupled filter may be more efficient at achieving the desired output bit rate.

Returning again to FIG. 3, bit rate control block 102 is shown to have input block 162. Input block 162 represents factors received from outside the data compressor which may influence how bit rate data control block 102 operates. One such factor which comes from outside the data compressor is the desired bit rate. Other external factors can also be taken into account by bit rate control block 102. One such factor may be the amount of data which has already been compressed but which has not yet been transmitted. In other words, as encoded output data frame 158 is output from the compressor, the compressor may want to monitor how many data frames have previously been output but are still waiting to be transmitted. This delay in transmission is generally referred to as data latency. As data latency increases, it may be desirable to reduce the number of bits being output by the data compressor in order to give the data which has been compressed an opportunity to be transmitted without a large data latency. It is conceivable that any factor which would is indicate that it is desirable to transmit either a greater number of bits or a fewer number of bits can be utilized by bit rate control block 102 to help adjust and adapt the bit rate of the compressor.

Figure 9:
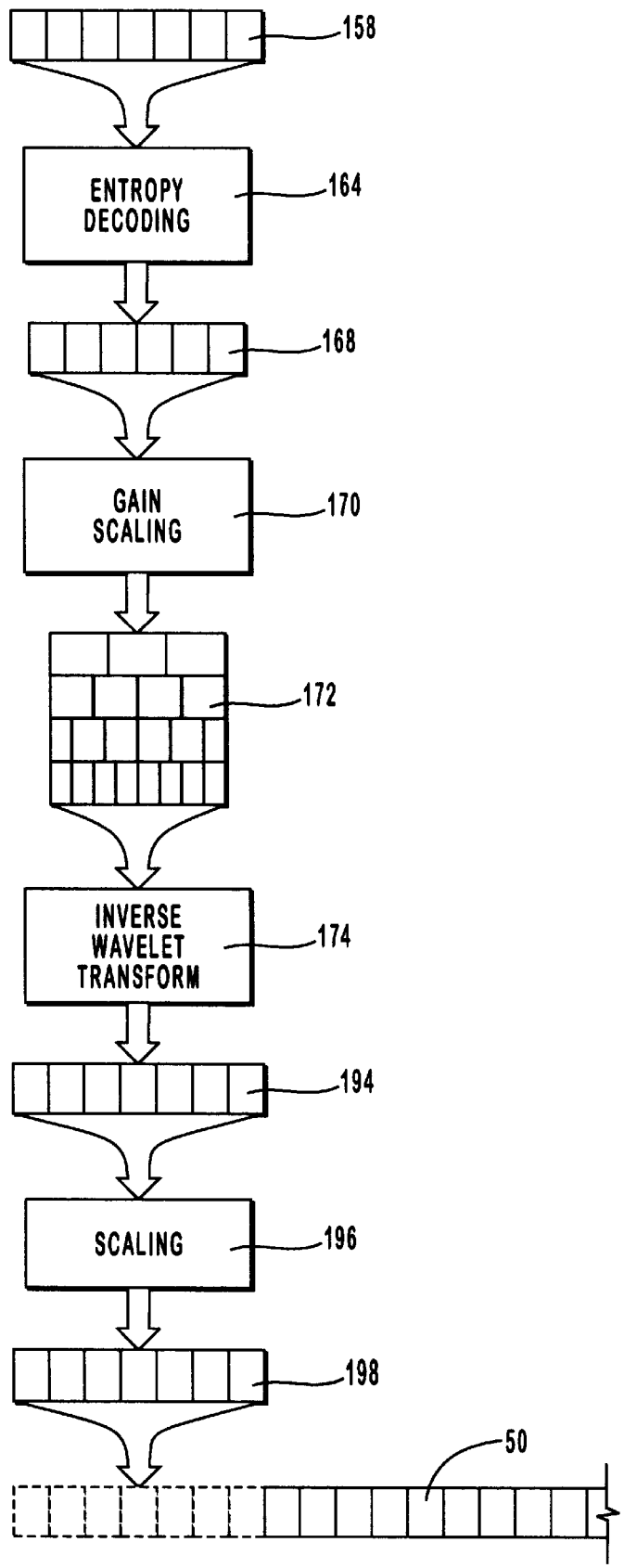
FIG. 9 represents the decompression process of one preferred embodiment of the present invention.

Turning now to FIG. 9, one preferred embodiment of a decompressor designed to operate with the disclosed compressor is illustrated. As indicated in FIG. 9, the process of decompressing a previously compressed data stream is much simpler than the process of compressing a data stream. This feature is common to most compression/decompression schemes. It is, however, interesting that when the disclosed compressor and decompressor are implemented on general purpose computer hardware, such as an IBM type personal computer, the amount of computing time needed to compress an input data stream and decompress an input data stream is remarkably similar with compression only taking about 50% more computing time to compress a data stream than to decompress a data stream. Furthermore, the compressor and decompressor can run in real time or near real time on a Pentium class computer and use only about 30% of the total computing power.

Returning now to FIG. 9, the decompressor first takes encoded output data frame 158 and reverses the entropy decoding process. This is illustrated in FIG. 9 by entropy decoding block 164. The entropy decoding process simply reverses the Huffman encoding and run length encoding which has taken place in the compressor. The encoded gain is decoded using Huffman decoding and the gain coefficient codebook. The encoded quantization level is Huffman decoded using the quantization level codebook. The encoded coefficients, and any encoded run length markers are Huffman decoded using the proper coefficients codebook. As previously described, if the coefficients and run length markers were encoded using a codebook selected based on the quantization level, the encoded coefficients and run length markers must be decoded using a codebook selected based on the quantization level. Any encoded run counts are Huffman decoded using the run count codebook. Finally, entropy decoding block 165 replaces run length markers and associated run length counts with the appropriate number of zero coefficients. If entropy encoders other than the illustrative example disclosed herein are used, an appropriate entropy decoder will also be used.

The entropy decoding process results in a decoded output data frame 168. Since the entropy encoding process and entropy decoding process is preferably lossless, decoded output data frame 168 in FIG. 9 should be identical to output data frame 116 in FIG. 3 except that once the data frame has been entropy decoded there is no need to retain the quantization level value. Therefore, the quantization level is removed from reconstructed output data frame.

Decoded data frame 168 is then scaled by the data frame gain value. This is illustrated in FIG. 9 by gain scaling block 170. In gain scaling block 170, each wavelet coefficient is simply multiplied by the gain value included in decoded output data frame 168. Once this process has occurred, the gain value is no longer needed and may be discarded.

The rescaled wavelet coefficients are represented in FIG. 9 by scaled wavelet coefficient map 172. At this point, scaled wavelet coefficient map 172 is quite similar to reduced wavelet coefficient map 104 in FIG. 3. However, due to the quantization of the gain value and wavelet coefficients, scaled wavelet coefficient map 172 contains quantization noise which is not found in reduced wavelet coefficient map 104 in FIG. 3.

Figure 10:
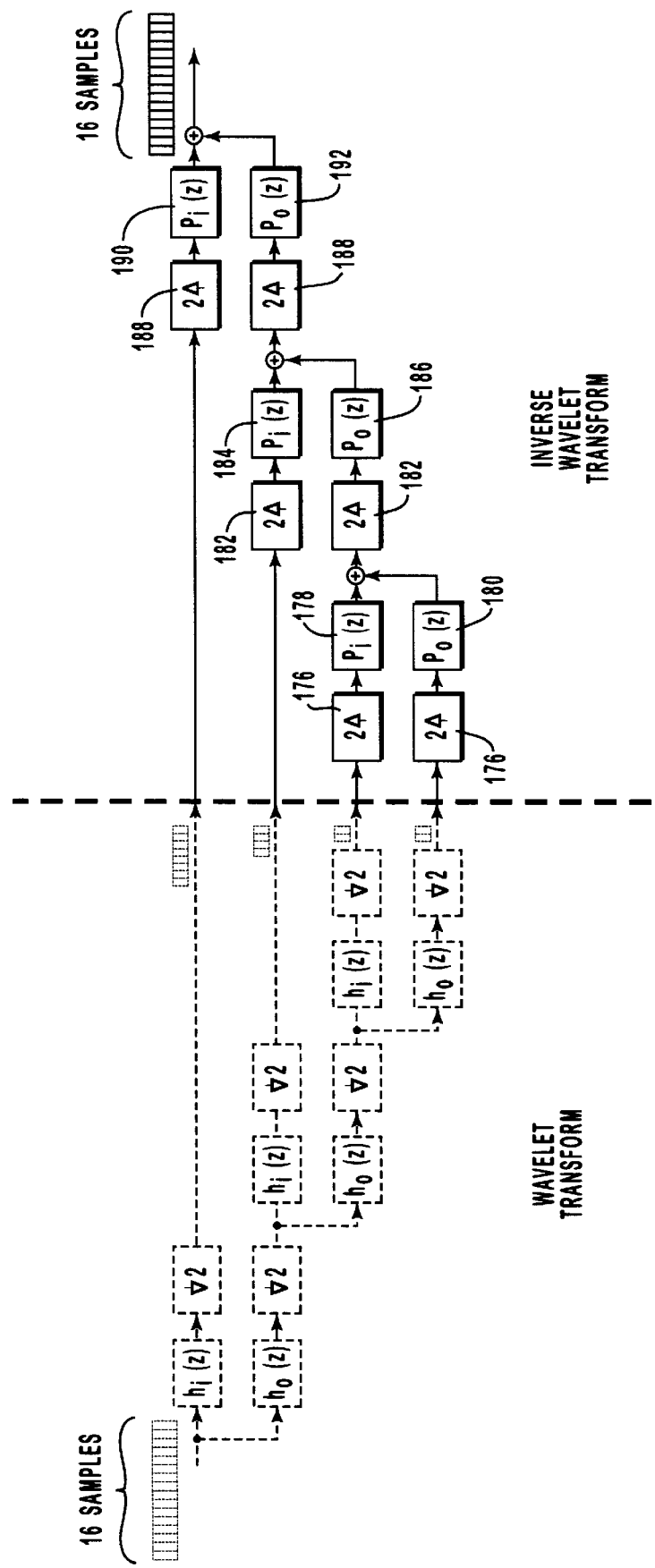
FIG. 10 is an illustrative example an inverse wavelet transform.

Returning to FIG. 9, scaled wavelet coefficient map 172 is then placed through an inverse wavelet transform illustrated in FIG. 9 by inverse wavelet transform block 174. The inverse wavelet transform is performed in a similar manner to the wavelet transform previously described. The general process is illustrated in FIG. 10. In FIG. 10, the initial wavelet transform using a standard decomposition tree structure is shown in phantom lines. This initial transform is presented by way of example and is the wavelet transform illustrated in FIG. 4. As indicated in FIG. 10, the process of the inverse wavelet transform can be implemented by reversing the decimation which occurred during the transform, filtering, and summing the outputs of the filters.

In order to explain the process more fully, the process begins with interpolation blocks 176. Interpolation blocks 176 are designed to reverse the effects of decimation blocks 80 in FIG. 4. The interpolation process is accomplished by inserting a zero value between the wavelet coefficients for these filter bands. The zero value replaces the value of the coefficient which was thrown away during the decimation process. After interpolation blocks 176, the coefficients are passed through high pass filter 178 and low pass filter 180. High pass filter 178 has an impulse response of $p_{1(z)}$ and low pass filter 180 has an impulse response of $p_0(z)$. The output of high pass filter 178 and low pass filter 180 are summed and fed to the next stage of the process as illustrated in FIG. 10.

As illustrated in FIG. 10, the output of the previous stage is input into low pass filter 186 after interpolation by interpolation block 182. Similarly, the coefficients from the high pass filter band wavelet decomposition process is fed into high pass filter 184 after interpolation by interpolation block 182. The process is then repeated at the next stage using interpolation blocks 188, high pass filter 190, and low pass 192. The final output is obtained by the sum of the final stage high pass filter and final stage low pass filter.

As previously indicated, the data compressor can use any wavelet transform. In one preferred embodiment, however, a Daubechies 12 wavelet transform is used. It is also presently preferred that a standard decomposition tree structure be used. The inverse wavelet transform as illustrated by inverse wavelet transform block 174 in FIG. 9, must be matched to the wavelet transform used in the data compressor. Thus, in one preferred embodiment inverse wavelet transform 174 is a Daubechies 12 inverse wavelet transform. Table 2 below gives the coefficients for the high pass filter and low pass filter of the inverse wavelet transform.

TABLE 2

INVERSE DAUBECHIES 12

| LOW PASS FILTER | HIGH PASS FILTER |
|---|---|
| −1.077301085000 E-03 | −1.1 15407433500 E-01 |
| 4.777257511000 E-03 | 4.946238903980 E-01 |
| 5.538422010000 E-04 | −7.511339080210 B-01 |
| −3.158203931800 E-02 | 3.152503517090 E-01 |
| 2.752286553000 E-02 | 2.262646939650 E-01 |
| 9.750160558700 E-02 | −1.297668675670 E-01 |
| −1.297668675670 E-01 | −9.750160558700 E-02 |
| −2.262646939650 E-01 | 2.752286553000 E-02 |
| 3.152503517090 E-01 | 3.158203931800 E-02 |
| 7.511339080210 E-01 | 5.538422010000 E-04 |
| 4.946238903980 E-01 | −4.777257511000 E-03 |
| 1.115407433500 E-01 | −1.077301085000 E-03 |

Returning to FIG. 9, after inverse wavelet transform 174, a scaled reconstructed time domain signal results. This is illustrated in FIG. 9 by scaled reconstructed data frame 194. Scaled reconstructed data frame 194 is analogous to scaled input data frame 58 in FIG. 3. In other words, scaled reconstructed data frame 194 represents the reconstructed time domain signal except for any scaling which was done by data scaling block 56 in FIG. 3. In order to reverse the effects of data scaling block 56 in FIG. 3, scale reconstructed data frame 194 is passed through scaling block 196.

At this point, reconstructed data frame 198 represents the reconstructed digital audio data. Reconstructed data frame 198 is placed on to output data stream 50. Output data stream 50 may then be played using an appropriate device designed to convert digital audio data stream 50 to sound which can be heard by an individual.

The present invention may be embodied in other specific forms without departing from its spirit or essential characteristics. The described embodiments are to be considered in all respect only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for compressing digitally sampled audio data into an average bit rate of compressed audio data, comprising the steps of:

a) performing a discrete wavelet transform on the digitally sampled audio data to obtain resultant wavelet coefficients;

b) eliminating according to a predetermined criteria a calculated fractional percentage of wavelet coefficients to achieve the average bit rate;

c) quantizing the wavelet coefficients using a selected quantization level;

d) entropy encoding the quantized coefficients to obtain the compressed audio data; and e) feeding the number of bits used to represent the entropy encoded coefficients back into the calculation of the fractional percentage of wavelet coefficients which must be eliminated to achieve the average bit rate.

2. A method for compressing digitally sampled audio data as recited in claim 1 wherein the calculating a fractional percentage of wavelet coefficients which much be eliminated comprises changing the selected quantization level.

3. A method for compressing digitally sampled audio data as recited in claim 1 wherein the entropy encoding comprises run length encoding.

4. A method for compressing digitally sampled audio data as recited in claim 1 wherein the entropy encoding comprises Huffman encoding.

5. A method for compressing digitally sampled audio data as recited in claim 1 wherein the entropy encoding comprises a combination of entropy encoding methods.

6. A method for compressing digitally sampled audio data as recited in claim 5 wherein the combination of entropy encoding methods comprises a combination of run length encoding and Huffman encoding.

7. A method for compressing digitally sampled audio data as recited in claim 1 wherein the predefined criteria for eliminating the calculated fractional percentage of wavelet coefficients is to eliminate wavelet coefficients with a smaller magnitude first.

8. A method for compressing digitally sampled audio data as recited in claim 1 wherein the quantization level used to quantize the wavelet coefficients is selected based on a psychoacoustic model.

9. A method for compressing digitally sampled audio data as recited in claim 8 wherein the psychoacoustic model utilizes one or more parameters derived from the digitally sampled audio data.

10. A method for compressing digitally sampled audio data as recited in claim 9 wherein the one or more parameters derived from the digitally sampled audio data comprises the energy of a portion of the digitally sampled audio data.

11. A method for compressing digitally sampled audio data as recited in claim 9 wherein the one or more parameters derived from the digitally sampled audio data comprises a measure of the entropy of a portion of the digitally sampled audio data.

12. A method for compressing digitally sampled audio data as recited in claim 1 wherein the selected quantization level used to quantize the wavelet coefficients is selected based on the calculated percentage of wavelet coefficients to be eliminated.

13. A method for compressing digitally sampled audio data as recited in claim 1 comprising the further step of scaling the wavelet coefficients so they lie between −1.0 and +1.0 prior to the step of calculating a fractional percentage of wavelet coefficients which must be eliminated to achieve the average bit rate.

14. A method for compressing digitally sampled audio data which has been divided into data frames containing a predefined number of digital audio data samples into an average bit rate of compressed audio data, the method comprising the steps of:

a) performing a discrete wavelet transform on the data frame to obtain the corresponding wavelet coefficients;

b) calculating a fractional percentage of wavelet coefficients which must be eliminated in this frame in order to achieve the average bit rate;

c) eliminating the calculated fractional percentage of wavelet coefficients according to a predefined criteria;

d) selecting a quantization level for the wavelet coefficients based on a psychoacoustic model which uses one or more parameters derived from the data in the data frame;

e) quantizing the wavelet coefficients at the selected quantization level;

f) entropy encoding the quantized wavelet coefficients to obtain the compressed audio data; and g) feeding the number of bits used to represent the entropy encoded coefficients back into the calculation of the fractional percentage of wavelet coefficients which must be eliminated to achieve the average bit rate.

15. A method for compressing digitally sampled audio data as recited in claim 14 wherein the predefined criteria to eliminate the calculated fractional percentage of wavelet coefficients comprises eliminating wavelet coefficients having a smaller magnitude first.

16. A method for compressing digitally sampled audio data as recited in claim 15 wherein calculating a fractional percentage of wavelet coefficients which must be eliminated comprises changing the selected quantization level.

17. A method for compressing digitally sampled audio data as recited in claim 16 further comprising the step of calculating the energy in the data frame before the step of performing a discrete wavelet transform.

18. A method for compressing digitally sampled audio data as recited in claim 17 wherein the one or more parameters derived from the data in the data frame comprises the calculated energy of the data in the data frame.

19. A method for compressing digitally sampled audio data as recited in claim 18 further comprising the step of dividing each wavelet coefficient by a fixed gain prior to the step of quantizing the wavelet coefficients.

20. A method for compressing digitally sampled audio data as recited in claim 19 wherein the gain is the a filtered estimate of the maximum wavelet coefficient in the data frame.

21. A method for compressing digitally sampled audio data as recited in claim 20 wherein the entropy encoding comprises run length encoding which produces at least a run length encoding symbol and a run length encoding count for each run of contiguous eliminated coefficients.

22. A method for compressing digitally sampled audio data as recited in claim 21 wherein the entropy encoding further comprises Huffman encoding.

23. A method for compressing digitally sampled audio data as recited in claim 22 wherein the entropy encoding comprises an adaptive codebook entropy encoding method.

24. A method for compressing digitally sampled audio data as recited in claim 22 wherein the selected quantization level is entropy encoded using a first codebook.

25. A method for compressing digitally sampled audio data as recited in claim 24 wherein the gain is entropy encoded using a second codebook.

26. A method for compressing digitally sampled audio data as recited in claim 25 wherein the run length encoding count is encoded using a third codebook.

27. A method for compressing digitally sampled audio data as recited in claim 26 wherein the quantized wavelet coefficients are entropy encoded using a fourth codebook.

28. A method for compressing digitally sampled audio data as recited in claim 27 wherein the fourth codebook is selected, based on the quantization level, from a set of wavelet coefficient codebooks.

29. A method for compressing digitally sampled audio data as recited in claim 28 wherein the one or more parameters derived from the data in the data frame comprises a measure of the entropy of the data in the data frame.

30. A method for compressing digitally sampled audio data as recited in claim 29 further comprising the step of scaling the wavelet coefficients so they lie between −1.0 and +1.0 prior to the step of eliminating the calculated fractional percentage of wavelet coefficients needed to achieve the bit rate.

31. A method for compressing digitally sampled audio data which has been divided into data frames containing a predefined number of digital audio data samples into an average bit rate of compressed audio data, the method comprising the steps of:
   a) calculating the energy of the data frame;
   b) performing a discrete wavelet transform on the data frame to obtain the corresponding wavelet coefficients;
   c) scaling the wavelet coefficients so they lie between −1.0 and +1.0;
   d) using a number of bits output last data frame to calculate a fractional percentage of wavelet coefficients which must be eliminated in this frame in order to achieve the average bit rate;
   e) eliminating all wavelet coefficients that fall below a predefined threshold;
   f) eliminating wavelet coefficients starting with the smallest remaining values until the calculated fractional percentage of wavelet coefficients needed to achieve the average bit rate have been eliminated;
   g) dividing all wavelet coefficients by a gain, the gain comprising a filtered estimate of the maximum wavelet coefficient in the frame;
   i) selecting a quantization level for the wavelet coefficients based on a psychoacoustic model which uses the calculated energy of the data frame;
   j) quantizing the wavelet coefficients at the selected quantization level; and
   k) entropy encoding the quantized wavelet coefficients using run length encoding of contiguous eliminated wavelet coefficients followed by Huffman encoding to obtain the compressed audio data.

32. A method for compressing digitally sampled audio data as recited in claim 31 further comprising changing the fractional percentage of wavelet coefficients which must be eliminated by changing the selected quantization level if the fractional percentage of wavelet coefficients which must be eliminated falls outside a predetermined range.

33. A method for compressing digitally sampled audio data as recited in claim 31 wherein the selected quantization level is included in the data frame.

34. A method for compressing digitally sampled audio data as recited in claim 31 wherein the selected quantization level is entropy encoded using a first codebook and included in the data frame.

35. A method for compressing digitally sampled audio data as recited in claim 34 wherein the gain is entropy encoded using a second codebook and included in the data frame.

36. A method for compressing digitally sampled audio data as recited in claim 35 wherein the run length encoding count is encoded using a third codebook.

37. A method for compressing digitally sampled audio data as recited in claim 36 wherein the quantized wavelet coefficients are entropy encoded using a fourth codebook.

38. A method for compressing digitally sampled audio data as recited in claim 37 wherein the fourth codebook is selected, based on the quantization level, from a set of wavelet coefficient codebooks.

39. A method of reconstructing digitally sampled audio information which has been previously compressed into compressed digitally sampled audio information, the method comprising the steps of:
   a) entropy decoding the compressed digitally sampled audio information to obtain entropy decoded information comprising wavelet coefficients wherein the wavelet coefficients are resultant from decimation of a calculated fractional percentage of wavelet coefficients necessary to achieve an average bit rate of the compressed digitally sampled audio information;
   b) performing an inverse discrete wavelet transform on the entropy decoded information to obtain inverse wavelet transformed data, a portion of which are comprised of interpolated data for mitigating the effects of decimation of wavelet coefficients; and
   c) rescaling the inverse wavelet transformed data into the time domain to obtain the digitally sampled audio information.

40. A method of reconstructing digitally sampled audio information which has been previously compressed as recited in claim 39 comprising the further step of multiplying each wavelet coefficient by a gain factor prior to performing the inverse discrete wavelet transform.

41. A method of reconstructing digitally sampled audio information which has been previously compressed as recited in claim 40 wherein the previously compressed data has been formed into one or more data frames.

42. A method of reconstructing digitally sampled audio information which has been previously compressed as recited in claim 41 wherein the gain factor is found in the one or more data frames.

43. A method of reconstructing digitally sampled audio information which has been previously compressed as recited in claim 39 wherein rescaling the transformed data into the time domain comprises converting the transformed values into integer values.

44. An article of manufacture comprising:
   a computer usable medium having computer readable program code means embedded therein for compressing digitally sampled audio data, the computer readable program code means comprising:
   a) means for performing a discrete wavelet transform on the digitally sampled audio data to obtain the resultant wavelet coefficients;
   b) means for eliminating according to a predetermined criteria a calculated fractional percentage of wavelet coefficients to achieve the average bit rate;
   c) means for quantizing the wavelet coefficients using a selected quantization level;
   d) means for entropy encoding the quantized coefficients to obtain the compressed audio data; and
   e) means for feeding the number of bits used to represent the entropy encoded coefficients back into the means for calculating the fractional percentage of wavelet coefficients which must be eliminated to achieve the average bit rate.

45. An article of manufacture as recited in claim 44 wherein the means for calculating a fractional percentage of wavelet coefficients which much be eliminated comprises means for changing the selected quantization level.

46. An article of manufacture as recited in claim 44 wherein the means for entropy encoding the quantized coefficients comprises means for run length encoding.

47. An article of manufacture as recited in claim 44 wherein the means for entropy encoding comprises means for Huffman encoding.

48. An article of manufacture as recited in claim 44 wherein the means for entropy encoding comprises means for entropy encoding the quantized wavelet coefficients using a combination of entropy encoding methods.

49. An article of manufacture as recited in claim 48 wherein the means for entropy encoding the quantized wavelet coefficients comprises means for run length encoding the quantized wavelet coefficients and means for Huffman encoding the quantized wavelet coefficients.

50. An article of manufacture as recited in claim 49 further comprising means to divide the wavelet coefficients by a gain.

51. An article of manufacture as recited in claim 50 further comprising means for entropy encoding the gain using a first codebook.

52. An article of manufacture as recited in claim 51 further comprising means for entropy encoding the selected quantization level using a second codebook.

53. An article of manufacture as recited in claim 52 further comprising means for entropy encoding the quantized wavelet coefficients using a third codebook.

54. An article of manufacture as recited in claim 53 wherein the means for run length encoding the quantized wavelet coefficients produces at least a run length marker and a run length count for each run length encoded sequence of coefficients.

55. An article of manufacture as recited in claim 54 further comprising means for entropy encoding the run length count using a fourth codebook.

56. An article of manufacture as recited in claim 44 wherein the predefined criteria for eliminating the calculated fractional percentage of wavelet coefficients is to eliminate wavelet coefficients with a smaller magnitude first.

57. An article of manufacture as recited in claim 44 wherein the quantization level used to quantize the wavelet coefficients is selected based on a psychoacoustic model.

58. An article of manufacture as recited in claim 57 wherein the psychoacoustic model utilizes one or more parameters derived from the digitally sampled audio data.

59. An article of manufacture as recited in claim 58 wherein the one or more parameters derived from the digitally sampled audio data comprises the energy of a portion of the digitally sampled audio data.

60. An article of manufacture as recited in claim 59 wherein the one or more parameters derived from the digitally sampled audio data comprises a measure of the entropy of a portion of the digitally sampled audio data.

61. An article of manufacture as recited in claim 44 wherein the selected quantization level used to quantize the wavelet coefficients is selected based on the calculated percentage of wavelet coefficients to be eliminated.

62. An article of manufacture as recited in claim 44 further comprising means to divide the wavelet coefficients by a gain.

63. An article of manufacture as recited in claim 62 wherein the gain represents a filtered estimate of the maximum wavelet coefficient value.

64. An article of manufacture as recited in claim 62 wherein the gain provides small signal suppression when the maximum wavelet coefficient value drops rapidly.

65. An article of manufacture comprising:
a computer usable medium having computer readable program code means embedded therein for compressing digitally sampled data into an average bit rate of compressed sampled data, the computer readable program code means comprising:
a) means for dividing the digitally sampled data into data frames containing a predefined number of digital data samples;
b) means for performing a discrete wavelet transform on the data frame to obtain the corresponding wavelet coefficients;
c) means for calculating a fractional percentage of wavelet coefficients which must be eliminated in a current data frame in order to achieve a average bit rate;
d) means for eliminating the calculated fractional percentage of wavelet coefficients according to a predefined criteria;
e) means for selecting a quantization level for the wavelet coefficients based on a psychoacoustic model which uses one or more parameters derived from the data in the current data frame;
f) means for quantizing the wavelet coefficients at the selected quantization level;
g) means for entropy encoding the quantized wavelet coefficients to obtain the compressed sampled data; and
h) means for feeding the number of bits used to represent the entropy encoded coefficients back into the means for calculating the fractional percentage of wavelet coefficients which must be eliminated to achieve the average bit rate.

66. An article of manufacture as recited in claim 65 wherein the predefined criteria to eliminate the calculated fractional percentage of wavelet coefficients comprises eliminating wavelet coefficients having a smaller magnitude first.

67. An article of manufacture as recited in claim 66 wherein the means to calculate a fractional percentage of wavelet coefficients which must be eliminated comprises means for changing the selected quantization level.

68. An article of manufacture as recited in claim 67 further comprises means for scaling the wavelet coefficients so they lie between −1.0 and +1.0.

69. An article of manufacture as recited in claim 68 further comprising means for calculating the energy in the data frame.

70. An article of manufacture as recited in claim 69 wherein the one or more parameters derived from the data in the data frame comprises the calculated energy of the data in the data frame.

71. An article of manufacture as recited in claim 70 means for dividing each wavelet coefficient by a fixed gain prior to quantizing the wavelet coefficients.

72. An article of manufacture as recited in claim 71 wherein the gain is a filtered estimate of the maximum wavelet coefficient in the data frame.

73. An article of manufacture as recited in claim 72 wherein the means for entropy encoding comprises an adaptive codebook entropy encoding means.

74. An article of manufacture as recited in claim 72 wherein the means for entropy encoding comprises means for run length encoding which produces at least a run length encoding symbol and a run length count for each run of contiguous eliminated coefficients.

75. An article of manufacture as recited in claim 74 wherein the means for entropy encoding further comprises means for Huffman encoding.

76. An article of manufacture as recited in claim 75 comprising means for entropy encoding the selected quantization level using a first codebook.

77. An article of manufacture as recited in claim 76 comprising means for entropy encoding the gain using a second codebook.

78. An article of manufacture as recited in claim 77 comprising means for entropy encoding the run length coding count using a third codebook.

79. An article of manufacture as recited in claim 78 wherein the means for entropy encoding the quantized wavelet coefficients comprises means for entropy encoding the quantized wavelet coefficients using a fourth codebook.

80. An article of manufacture as recited in claim 79 comprising means for selecting the fourth codebook, based on the quantization level, from a set of wavelet coefficient codebooks.

81. An article of manufacture as recited in claim 80 wherein the one or more parameters derived from the data in the data frame comprises a measure of the entropy of the data in the data frame.

82. An article of manufacture comprising:
a computer readable medium having computer readable program code means embedded therein for compressing digitally sampled audio data into an average bit rate of compressed audio data, the computer readable program code means comprising:
a) means for dividing the digitally sampled audio data into data frames containing a predefined number of digital audio data samples;
b) means for calculating the energy of the data frame;
c) means for performing a discrete wavelet transform on the data frame to obtain the corresponding wavelet coefficients;
d) means for scaling the wavelet coefficients so they lie between −1.0 and +1.0;
e) means for using a number of bits output last data frame to calculate a fractional percentage of wavelet coefficients which must be eliminated in this frame in order to achieve the average bit rate;
f) means for eliminating all wavelet coefficients that fall below a predefined threshold;
g) means for eliminating wavelet coefficients starting with the smallest remaining values until the calculated fractional percentage of wavelet coefficients needed to achieve the average bit rate have been eliminated;
h) means for dividing all wavelet coefficients by a fixed gain, the fixed gain comprising a filtered estimate of the maximum wavelet coefficient in the frame;
i) means for selecting a quantization level for the wavelet coefficients based on a psychoacoustic model which uses the calculated energy of the data frame;
j) means quantizing the wavelet coefficients at the selected quantization level; and
k) means for entropy encoding the quantized wavelet coefficients using run length encoding of contiguous eliminated wavelet coefficients followed by Huffmnan encoding to obtain the compressed audio data.

83. An article of manufacture as recited in claim 82 further comprising means for changing the fractional percentage of wavelet coefficients which must be eliminated by changing the selected quantization level if the fractional percentage of wavelet coefficients which must be eliminated falls outside a predetermined range.

84. An article of manufacture as recited in claim 83 wherein the selected quantization level is included in the data frame.

85. An article of manufacture as recited in claim 83 comprising means for entropy encoding the selected quantization level using a first codebook.

86. An article of manufacture as recited in claim 85 comprising means for entropy encoding the gain using a second codebook.

87. An article of manufacture as recited in claim 86 comprising means for entropy encoding the run length count using a third codebook.

88. An article of manufacture as recited in claim 87 comprising means for entropy encoding the quantized wavelet coefficients using a fourth codebook.

89. An article of manufacture as recited in claim 88 comprising means to select the fourth codebook, based on the quantization level, from a set of wavelet coefficient codebooks.

90. An article of manufacture comprising:
a computer usable medium having computer readable code means embedded therein for reconstructing digitally sampled information which has been previously compressed into compressed digitally sampled information, the computer readable code means comprising:
a) means for entropy decoding the compressed digitally sampled information to obtain entropy decoded information comprising wavelet coefficients;
b) means for performing an inverse discrete wavelet transform on the entropy decoded information to obtain inverse wavelet transformed data; and
c) means for rescaling the inverse wavelet transformed data into the time domain to obtain the digitally sampled information.

91. An article of manufacture as recited in claim 90 comprising means for multiplying each wavelet coefficient by a gain factor before the wavelet coefficients are transformed by the means for performing an inverse discrete wavelet transform.

92. An article of manufacture as recited in claim 91 comprising means for forming the previously compressed data into one or more data frames.

93. An article of manufacture as recited in claim 92 wherein the gain factor is found in the one or more data frames.

94. An article of manufacture as recited in claim 90 wherein the means for rescaling the inverse wavelet transformed data into the time domain comprises means for converting the transformed data into integer values.

* * * * *